United States Patent
Xu et al.

(10) Patent No.: US 11,994,576 B2
(45) Date of Patent: May 28, 2024

(54) RADAR SYSTEMS AND METHODS

(71) Applicant: Huawei Technologies Co., Ltd., Shenzhen (CN)

(72) Inventors: Luzhou Xu, San Diego, CA (US); Ricky Lap Kei Cheung, San Diego, CA (US); Hsing Kuo Lo, San Diego, CA (US); Jianghua Ying, San Diego, CA (US); Yuan Su, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 585 days.

(21) Appl. No.: 17/198,785

(22) Filed: Mar. 11, 2021

(65) Prior Publication Data
US 2021/0215816 A1   Jul. 15, 2021

Related U.S. Application Data

(63) Continuation of application No. PCT/CN2019/110524, filed on Oct. 11, 2019.
(Continued)

(51) Int. Cl.
*G01S 13/524* (2006.01)
*G01S 13/32* (2006.01)
(Continued)

(52) U.S. Cl.
CPC ............ *G01S 13/582* (2013.01); *G01S 13/32* (2013.01); *G01S 13/524* (2013.01);
(Continued)

(58) Field of Classification Search
CPC ........ G01S 13/524; G01S 13/24; G01S 13/32; G01S 13/582; G01S 13/584; G01S 7/2883; G01S 13/931
See application file for complete search history.

(56) References Cited

U.S. PATENT DOCUMENTS 7,339,518 B2   3/2008 Natsume et al.
8,081,105 B2  12/2011 Tigrek et al.
(Continued)

OTHER PUBLICATIONS

M. Song, J. Lim, D. -J. Shin and J. Sohn, "Enhancing Doppler estimation via newton interpolation for automotive FMCW radars," 2014 International Conference on Information and Communication Technology Convergence (ICTC), Busan, Korea (South), 2014, pp. 615-616, doi: 10.1109/ICTC.2014.6983228. (Year: 2014).*
(Continued)

*Primary Examiner* — Matthew M Barker
(74) *Attorney, Agent, or Firm* — Vierra Magen Marcus LLP

(57) ABSTRACT

A radar system transmits pulses towards a target and receives pulses reflected back therefrom. Based on samples (of the received pulses) corresponding to a CPI, a first 2D matrix having a slow-time index and a fast-time index is generated. A slow-time FFT is performed to convert the slow-time index to a Doppler bin index to produce a second 2D matrix having the Doppler bin index and the fast-time index. Thereafter, a 1D interpolation is performed along the Doppler bin index to produce a third 2D matrix having a Velocity bin index and the fast-time index. Thereafter, a fast-time FFT is performed to convert the fast-time index to a Range bin index to produce a fourth 2D matrix having the Velocity bin index and a Range bin index. A distance to and a velocity of a target is determined based on the fourth 2D matrix.

23 Claims, 17 Drawing Sheets

Related U.S. Application Data

(60) Provisional application No. 62/750,666, filed on Oct. 25, 2018.

(51) Int. Cl.
    *G01S 13/58*     (2006.01)
    *G01S 7/288*     (2006.01)
    *G01S 13/931*     (2020.01)

(52) U.S. Cl.
    CPC ........... *G01S 13/584* (2013.01); *G01S 7/2883* (2021.05); *G01S 13/931* (2013.01)

(56) References Cited

U.S. PATENT DOCUMENTS

| | | | |
|---|---|---|---|
| 9,784,828 B2 | 10/2017 | Patole et al. | |
| 2005/0280571 A1* | 12/2005 | Abatzoglou | G01S 13/9029 342/107 |
| 2012/0076190 A1 | 3/2012 | Sturm et al. | |
| 2014/0035776 A1 | 2/2014 | Sochen et al. | |
| 2016/0061947 A1 | 3/2016 | Patole et al. | |
| 2016/0124086 A1* | 5/2016 | Jansen | G01S 13/931 342/107 |

OTHER PUBLICATIONS

Chen, V.C., et al., "3-D Time/Frequency-Range-Doppler Signatures for SAR Imaging of Ground Moving Targets", RTO-MP-SET-080, R&T Organization, Jan. 2005, 8 pages.

Ash, M., et al., "A New Multistatic FMCW Radar Architecture By Over-The-Air Deramping", IEEE Sensors Journal, vol. 15, No. 12, Dec. 2015, 8 pages.

Ilioudis, C., "Introduction to Radar Signal Processing", Powerpoint presentation, University of Strathclyde, Glasgow, UK, Jun. 2017, 52 pages.

Richards, M.A., "The Keystone Transformation for Correcting Range Migration in Range-Doppler Processing", Mar. 28, 2014, 29 pages.

Altera, "Implementing Digital Processing for Automotive Radar Using SoCs", White Paper, WP-01183-1.3, Dec. 2013, 16 pages.

Meng, Jia et al., "Compressive Sensing Based High-Resolution Channel Estimation for OFDM System", IEEE Journal of Selected Topics in Signal Processing, vol. 6, No. 1, Feb. 2012, 11 pages.

Tigrek, R.F., "A Processing Technique For OFDM-Modulated Wideband Radar Signals", Nov. 4, 2010, 180 pages.

Fink, Johannes et al., "Comparison of OFDM Radar and Chirp Sequence Radar", 2015 16th International Radar Symposium, 2015, 6 pages.

Ramasubramanian, Karthik, "Using a Complex-Baseband Architecture in FMCW Radar Systems", Texas Instruments, May 2017, 10 pages.

Patrick, D., et al., "FMCW Based Mimo Imaging Radar", ARMMS, Apr. 2014, 22 pages.

Parker, Michael, "Design How-To Radar Basics-Part 1", EE Times, May 2011, 40 pages.

Dham, Vivek, "Programming Chirp Parameters in TI Radar Devices", Texas Instruments, Application Report, SWRA553, May 2017, 15 pages.

Kregoski, Greg, "FMCW Radar in Automotive Applications, Technology Overview & Testing", Rohde & Schwarz, 2016, 44 pages.

\* cited by examiner

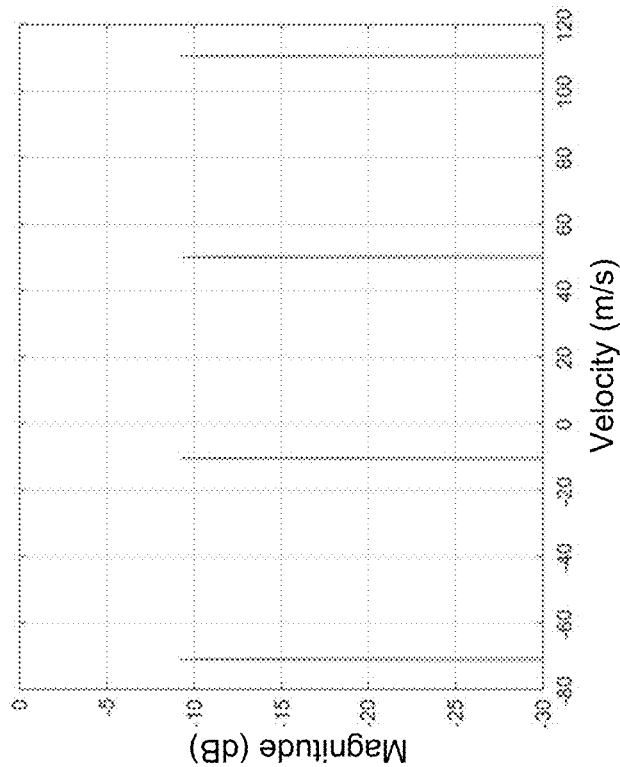
FIG. 3B *(Prior Art)*
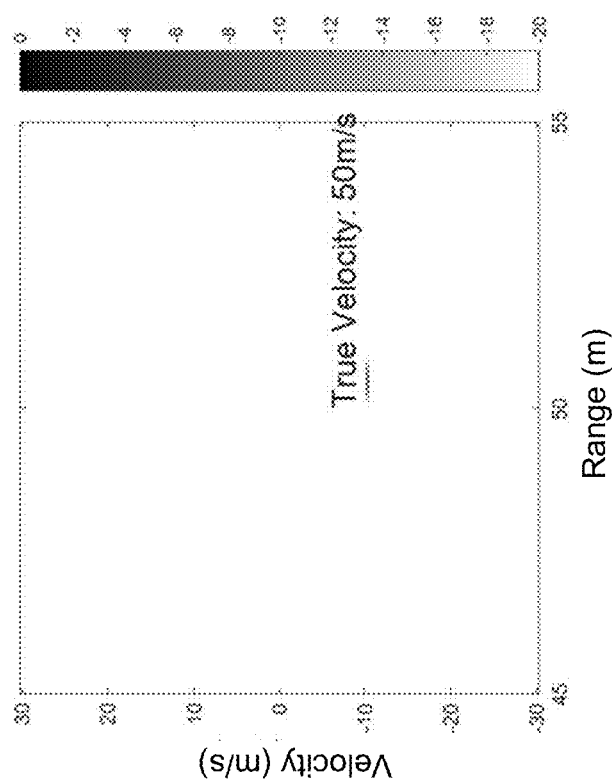
FIG. 3A *(Prior Art)*

RADAR SYSTEMS AND METHODS

CLAIM FOR PRIORITY

This application claims priority to PCT/CN2019/110524, filed Oct. 11, 2019, and entitled "Improved Radar Systems And Methods," which claims priority to U.S. provisional patent application Ser. No. 62/750,666, filed on Oct. 25, 2018 and entitled "Improved Radar Systems And Methods," which is incorporated herein by reference as if reproduced in its entirety.

TECHNICAL FIELD

The disclosure generally relates to radar systems and methods for use therewith.

BACKGROUND

Radar (RAdio Detection And Ranging) has been used for a long time in both military and commercial applications. More recently, radar has begun to be used in automobiles for various purposes, including, advanced driver assistance systems (ADAS), self-driving, parking assistance, lane departure warning, automatic distance control, cut-in collision warning, rear-end collision warning, front-end collision warning, and blind spot detection, just to name a few.

Automotive radar applications often use frequency modulated continuous waveform (FMCW) radar. In FMCW radar, by transmitting a series of FMCW signals and receiving and processing their reflections, obstacles (also referred to as targets or objects) can be detected, and their distances, moving velocities, angles, and even shapes can be detected. More specifically, in FMCW radar, periodic pulses whose frequency content varies with time are emitted. The range to a target can be found by detecting a frequency difference between the received and emitted radar signals. The range to the target is proportional to this frequency difference, which is also referred to as the beat frequency.

A coherent processing interval (CPI) in a radar system, such as an FMCW radar system, is defined by a set of adjacent pulses that form a pulse train that have a deterministic phase relationship with respect to a reference carrier frequency. Standard Range-Doppler (RD) processing is typically used in existing automotive radar systems, which assumes that vehicle range change within the CPI is larger than range resolution and, hence, is neglected. However, this assumption becomes unsatisfied as modern automotive radar systems that require increased range resolution and need to handle increases in an objects' moving speed and changes thereto. For example, the range-walking problem occurs, which limits the radar's achievable signal-to-noise ratio (SNR) and range resolution. Moreover, standard RD processing suffers from the Doppler ambiguity problem, especially when multiple transmit (TX) antennas are used.

SUMMARY

According to one aspect of the present disclosure, a method for use by a radar system is used to detect a distance to and a velocity of a target relative to the radar system. Such a method includes driving a transmit antenna with a modulated transmission signal to thereby transmit a plurality of pulses towards a target. The method furtherer includes receiving, at a receive antenna, at least some of the plurality of pulses that are transmitted towards and reflected from the target. Additionally, the method includes processing the received pulses, including performing demodulation and sampling thereof, to produce a plurality of samples indicative of the received plurality of pulses. The method also includes generating, based on a set of the samples corresponding to a coherent processing interval (CPI), a first two-dimensional (2D) matrix having a slow-time index and a fast-time index. A slow-time FFT is performed on the first 2D matrix to thereby convert the slow-time index of the first 2D matrix to a Doppler bin index and thereby produce a second 2D matrix having the Doppler bin index and the fast-time index. After the slow-time FFT is performed, a one-dimensional (1D) interpolation is performed along the Doppler bin index to thereby convert the Doppler bin index to a Velocity bin index and thereby produce a third 2D matrix having a Velocity bin index and a fast-time index. After the 1D interpolation is performed, a fast-time FFT is performed on the third 2D matrix to thereby convert the fast-time index to a Range bin index and thereby produce a fourth 2D matrix having the Velocity bin index and a Range bin index. The distance to and the velocity of the target relative to the radar system can then be determined based on the fourth 2D matrix having the Velocity bin index and the Range bin index.

Optionally, in any of the preceding aspects, the modulated transmission signal comprises a frequency modulated continuous waveform (FMCW) signal, in which case each slow-time index comprises a chirp index, and each fast-time index comprises a sample index.

Optionally, in any of the preceding aspects, the 1D interpolation is performed $$f_d = \frac{2v}{c}(f_0 + \gamma t),$$

using the following equation: where fa is a Doppler frequency, v is a velocity of the target relative to the radar system, $f_0$ is a starting frequency of an FMCW signal, $\gamma$ is a chirp slope rate, c is the speed of light, and t is the fast time.

The modulated transmission signal, instead of comprising an FMCW signal, can comprise an orthogonal frequency-division multiplexing (OFDM) signal, in which case each slow-time index comprises a symbol index, and each fast-time index comprises a subcarrier index. In such an embodiment, the 1D interpolation can be performed using the following equation $$f_d = \frac{2v}{c}(f_c + k\Delta f),$$

where $f_d$ is a Doppler frequency, v is a velocity of the target relative to the radar system, $f_c$ is a single carrier frequency (e.g., produced by the single carrier PLL 1505 in FIG. 15), k is the subcarrier index, $\Delta f$ is the frequency separation between consecutive orthogonal subcarrier frequencies. An exemplary value for $f_c$ is 77 GHz, and an exemplary value for $\Delta f$ is 1 MHz.

Optionally, in any of the preceding aspects, the performing the slow-time FFT on the first 2D matrix having the slow-time index and the fast-time index, to thereby convert the slow-time index to the Doppler bin index, comprises performing a separate FFT for each bin of the fast-time index along the slow-time index; and the performing the fast-time FFT on the third 2D matrix having the Velocity bin index and the fast-time index, to thereby convert the fast-time index to the Range bin index, comprises performing a separate FFT for each bin of the Velocity bin index along the fast-time index.

Optionally, in any of the preceding aspects, the 1D interpolation comprises one of nearest neighbor interpolation, linear interpolation, or spline interpolation.

Optionally, in any of the preceding aspects, the radar system can be a multiple-input and multiple-output (MIMO) radar system including a plurality of transmit antennas and a plurality of receive antennas. In such embodiments, each of the plurality of transmit antennas is driven by a respective modulated transmission signal. Further, each of the plurality of receive antenna receives at least some of the plurality of pulses that are transmitted towards and reflected from the target and thereby produces a respective reception signal. A respective first 2D matrix having a slow-time index and a fast-time index is generated based on samples of each of the reception signals corresponding to a CPI. A slow-time FFT is performed on each of the first 2D matrixes to thereby convert the respective slow-time index of each of the first 2D matrixes to a respective Doppler bin index, and thereby produce a respective second 2D matrix having the Doppler bin index and the fast-time index. After performing the slow-time FFTs, for each of the second 2D matrixes having the Doppler bin index and the fast-time index, a respective 1D interpolation is performed to thereby convert the Doppler bin index to a Velocity bin index, and thereby produce a respective third 2D matrix having a Velocity bin index and a fast-time index. After performing the 1D interpolations, for each of the third 2D matrixes having a Velocity bin index and a fast-time index, a respective fast-time FFT is performed on the third 2D matrix to thereby convert the fast-time index to a Range bin index, to thereby produce a respective fourth 2D matrix having the Velocity bin index and a Range bin index. The distance to and the velocity of the target relative to the radar system can then be based on the plurality of fourth 2D matrixes having the Velocity bin index and the Range bin index. Such fourth 2D matrixes can be referred to as RV images. Additionally, an angle of the target (e.g., azimuth angle and/or an elevation angle) relative to the MIMO radar system can be determined from the multiple RV images.

Optionally, in any of the preceding aspects, one of the following MIMO modulation schemes is used for MIMO modulation: Doppler Division Modulation (DDM) in slow-time; Code Division Modulation (CDM) in slow-time; Frequency Divisional Modulation (FDM) in fast-time; or Time Divisional Modulation (TDM) in slow-time.

Optionally, in any of the preceding aspects, the plurality of transmit antennas of a MIMO radar system comprise m transmit antennas, and each of the 1D interpolations is performed using the following equation $$f_{d,m} = \frac{2v}{c}(f_0 + \gamma t) + f_{mod,m},$$

where $f_{d,m}$ is a Doppler frequency for an m-th transmit antenna, v is a velocity of the target relative to the radar system, $f_0$ is a starting frequency of an FMCW signal, $\gamma$ is a chirp ramp slope, c is the speed of light, t is the fast time, and $f_{mod,m}$ is a modulated Doppler Frequency for the m-th transmit antenna.

According to one other aspect of the present disclosure, a radar system, comprises a waveform generator, a transmit antenna, a receive antenna, an analog-to-digital converter (ADC), and at least one processor. The waveform generator is configured to generate a modulated signal. The transmit antenna is configured to be driven by the modulated signal, to thereby transmit a plurality of pulses towards a target. The receive antenna is configured to receive at least some of the plurality of pulses that are transmitted towards and reflected from the target. The ADC is configured to produce a plurality of samples indicative of the received pulses. The processor(s) is/are configured to generate, based on a set of the samples corresponding to a CPI, a first 2D matrix having a slow-time index and a fast-time index. The processor(s) is/are configured to perform a slow-time FFT on the first 2D matrix to thereby convert the slow-time index of the first 2D matrix to a Doppler bin index and thereby produce a second 2D matrix having the Doppler bin index and the fast-time index. The processor(s) is/are also configured to perform (after the slow-time FFT is performed) a 1D interpolation along the Doppler bin index to thereby convert the Doppler bin index to a Velocity bin index and thereby produce a third 2D matrix having a Velocity bin index and a fast-time index. The processor(s) is/are configured to perform (after the 1D interpolation is performed) a fast-time FFT on the third 2D matrix to thereby convert the fast-time index to a Range bin index and thereby produce a fourth 2D matrix having the Velocity bin index and a Range bin index. The processor(s) is/are further configured to determine a distance to and a velocity of the target relative to the radar system based on the fourth 2D matrix having the Velocity bin index and the Range bin index.

Optionally, in any of the preceding aspects, the modulated transmission signal comprises a FMCW signal, in which case each slow-time index comprises a chirp index, and each fast-time index comprises a sample index. Alternatively, the modulated transmission signal comprises an OFDM signal, in which case each slow-time index comprises a symbol index, and each fast-time index comprises a subcarrier index. The use of other modulation techniques is possible and within the scope of the embodiments described herein.

Optionally, in any of the preceding aspects, the radar system comprises a MIMO radar system including a plurality of transmit antennas and a plurality of receive antennas. In such embodiments, each of the plurality of transmit antennas is driven by a respective modulated transmission signal. Each of the plurality of receive antennas receives at least some of the plurality of pulses that are transmitted towards and reflected from the target and thereby produces a respective reception signal. In the MIMO radar embodiments the at least one processor is configured to generate a respective first 2D matrix having a slow-time index and a fast-time index based on samples of each of the reception signals corresponding to a CPI; perform a slow-time FFT on each of the first 2D matrixes to thereby convert the respective slow-time index of each of the first 2D matrixes to a respective Doppler bin index, and thereby produce a respective second 2D matrix having the Doppler bin index and the fast-time index; after the slow-time FFTs are performed, for each of the second 2D matrixes having the Doppler bin index and the fast-time index, perform a respective 1D interpolation to thereby convert the Doppler bin index to a Velocity bin index, and thereby produce a respective third 2D matrix having a Velocity bin index and a fast-time index; after the 1D interpolations are performed, for each of the third 2D matrixes having a Velocity bin index and a fast-time index, perform a fast-time FFT on the third 2D matrix to thereby convert the fast-time index to a Range bin index, to thereby produce a respective fourth 2D matrix having the Velocity bin index and a Range bin index; and determine the distance to and the velocity of the target relative to the radar system based on the plurality of fourth 2D matrixes having the Velocity bin index and the Range bin index. Additionally, an angle of the target (e.g., azimuth angle and/or an elevation angle) relative to the MIMO radar system can be determined from the multiple RV images.

According to one other aspect of the present disclosure, a non-transitory computer-readable medium storing computer instructions that when executed by one or more processors of a radar system cause the one or more processors of the radar system to perform the steps of: generating, based on a set of samples corresponding to a CPI, a first 2D matrix having a slow-time index and a fast-time index; performing a slow-time FFT on the first 2D matrix to thereby convert the slow-time index of the first 2D matrix to a Doppler bin index and thereby produce a second 2D matrix having the Doppler bin index and the fast-time index; after performing the slow-time FFT, performing a one-dimensional (1D) interpolation along the Doppler bin index to thereby convert the Doppler bin index to a Velocity bin index and thereby produce a third 2D matrix having a Velocity bin index and a fast-time index; after performing the 1D interpolation, performing a fast-time FFT on the third 2D matrix to thereby convert the fast-time index to a Range bin index and thereby produce a fourth 2D matrix having the Velocity bin index and a Range bin index; and determining the distance to and the velocity of the target relative to the radar system based on the fourth 2D matrix having the Velocity bin index and the Range bin index.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 3A is a graph of range and velocity that illustrates a range ambiguity problem that can occur when using standard RD processing.

FIG. 3B is a graph of velocity and magnitude that illustrates a velocity ambiguity problem that can occur when using standard RD processing.

DETAILED DESCRIPTION

The present disclosure will now be described with reference to the figures, which in general relate to radar systems, and methods for use therewith.

Figure 1:
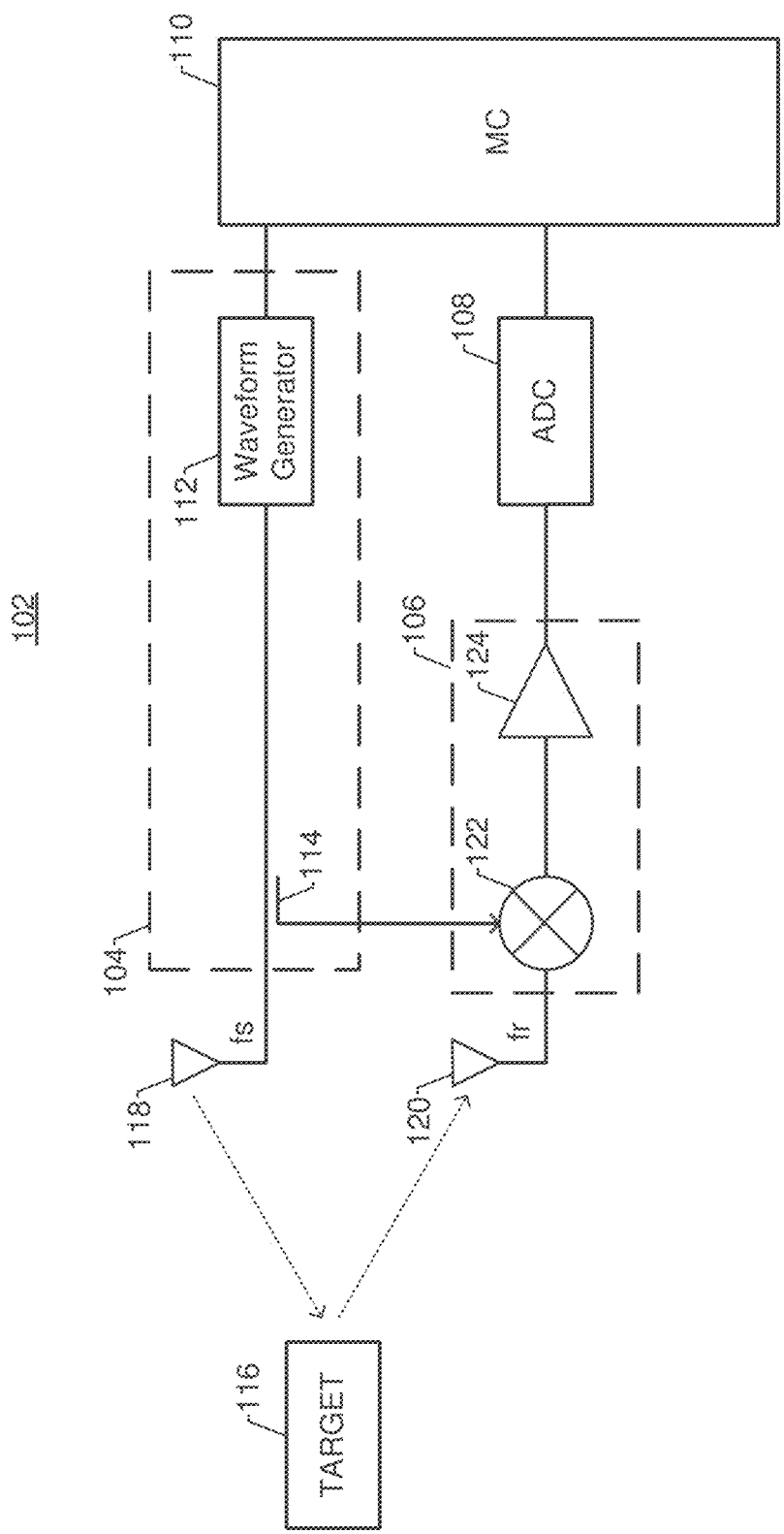
FIG. 1 illustrates an exemplary FMCW radar system with which certain embodiments of the present technology can be implemented.

An exemplary FMCW radar system 102 is shown in FIG. 1. The FMCW radar system 102, which can also be referred to more succinctly as the radar system 102 (or even more succinctly as the system 102), is shown as including a transmitter 104, a receiver 106, an analog-to-digital converter (ADC) 108, a microcomputer 110, a transmit antenna 118, and a receive antenna 120.

The transmitter 104 can transmit a radar wave (e.g., a millimeter radar wave) through the antenna 118. The transmitter 104 is shown as including waveform generator 112 and a splitter 114. The waveform generator 112, which can be a ramp generator, may include, e.g., a digital-to-analog converter (DAC) and a voltage controlled oscillator (VCO), but is not limited thereto. The waveform generator 112 generates a frequency modulated continuous waveform (FMCW) signal, which is an RF signal, e.g., in a millimeter waveband. Depending upon the specific implementation, the FMCW signal can gradually increase in frequency (e.g., from 77 GHz to 81 GHz) during a chirp period, or decrease in frequency (e.g., from 81 GHz to 77 GHz) during a chirp period, but is not limited thereto. Where the FMCW signal gradually increases from 77 GHz to 81 GHz its starting frequency $f_0$ is 77 GHz. Where the FMCW signal gradually decreases from 81 GHz to 77 GHz its starting frequency $f_0$ of 81 GHz.

The splitter 114 splits the RF signal (i.e., the FMCW signal in this example) generated by the waveform generator 112 into a transmission signal (e.g., a millimeter radar wave) fs and a local signal LO. The transmission signal fs has a recursively varying frequency determined by a digital signal produced by the microcomputer 110. The transmission signal fs is provided to the transmit antenna 118 and the local signal LO is provided to the receiver 106. It would also be possible for the transmitter 104 to include an amplifier that amplifies the fs signal before it is provided to the transmit antenna 118. In this manner, the transmit antenna 118 is driven with the transmission signal fs, to thereby transmit a plurality of FMCW chirps towards a target object 116 from which at least some of the plurality of FMCW chirps are reflected The receive antenna 120 receives a reflected radar wave which comes from the target object 116 reflecting the radar wave transmitted by the antenna 118, and outputs to the receiver 106 a reception signal fr according to the received reflected radar wave. In other words, the receive antenna 120 receives the reflected FMCW chirps to thereby produce the reception signal fr. The target object 116 can also be referred to herein more succinctly as the target 116, or alternatively as the object or the obstacle.

The receiver 106 includes a mixer 122 and an amplifier 124. The mixer 122 mixes the local signal LO and the reception signal fr from the antenna 120 to generate a beat signal corresponding to a frequency difference therebetween. The amplifier 124 amplifies the beat signal generated by the mixer 122. It would also be possible to swap the order of the mixer 122 and the amplifier 124, which would result in the reception signal fr being amplified before being mixed with the local signal LO. The beat signal, which can also be referred to as a beat-frequency signal, includes a tone whose frequency is proportional to a distance between the target and the radar system 102. The local signal LO is used to frequency down-convert the reception signal fr.

The amplified beat signal is provided to the ADC 108. The ADC 108 is used to sample the beat signal to convert the analog beat signal into a digital signal. The digital signal converted from the analog beat signal is provided to the microcomputer 110, which uses the inputted signal for calculating the distance and/or the relative velocity. Explained another way, the ADC 108 samples the beat signal during a coherent processing interval (CPI), and the microcomputer 110 processes the samples of the beat signal to determine the distance to and the velocity of the target 116 relative to the radar system 102. While not specifically shown in FIG. 1, one or more filters are likely in the receive path between the receive antenna 120 and the ADC 108.

The microcomputer 110 can include, e.g., a central processing unit (CPU), a read only memory (ROM), and a random access memory (RAM) and can calculate based on the digital data from the ADC 108 the distance to the target object and/or the relative velocity of the target object. The microcomputer 110 can be or include a digital signal processor (DSP) for executing Fast Fourier Transform (FFT) processes in a frequency analysis process. More generally, the microcomputer 110 can include one or more processors that can perform the necessary processing to determine the distance to and velocity of the target 116 relative to the radar system 102. The calculated distance and the calculated relative velocity can be, e.g., provided to a cruise velocity travel controller having a function for controlling the distance to the preceding vehicle and used in, for example, executing the function for controlling the distance. More generally, the calculated distance and velocity can be used for self-driving, parking assistance, lane departure warning, automatic distance control, cut-in collision warning, rear-end collision warning, front-end collision warning, and/or blind spot detection. These are just a few examples of the possible uses of the calculated distance and velocity, which examples are not intended to be all encompassing.

In accordance with certain embodiments, the radar wave that is produced by the transmitter is a frequency modulated continuous wave (FMCW), as note above. If reflected by the target object, the reflected radar wave is received by the antenna 120 and provided to the mixer 122. The mixer 122 mixes the reception signal fr generated by the antenna 120 with the local signal LO to generate the beat signal indicative of the frequency difference between the reception signal fr and the local signal LO, wherein the frequency of the local signal LO is equal to (i.e., the same as) the frequency of the transmission signal fs.

The frequency of the transmission signal fs (which is a FMCW signal) periodically varies, and a period of frequency variation of the transmission signal fs has a frequency increase interval (during which the frequency is gradually increased) or a frequency decrease interval (during which the frequency is gradually decreased). Such a frequency increase interval or a frequency decrease interval can also be referred to as a chirp period. During each of the frequency increase interval or the frequency decrease interval (i.e., during each chirp period), the ADC 108 samples the beat signal recursively at a predetermined sampling period and thereby converts the analog beat signal to a digital signal.

In the case that a velocity of a vehicle having the FMCW radar system 102 is equal to a velocity of the target object, that is, in the case that the relative velocity of the target object is zero, the reflected radar wave is retarded by a time which it takes for the radar wave to travel back and forth a distance between the target object and the FMCW radar system 102. In the case that the velocity of the vehicle having the FMCW radar system 102 is different from the velocity of the target object, that is, in the case that the relative velocity of the target object is not zero, the reflected radar wave has a Doppler shift. Therefore, the reception signal fr is shifted, relative to the transmission signal fs, in frequency by a frequency fd corresponding to the Doppler shift as well as in time by the retarded time td.

In FMCW radar, the transmission signal, referred to above as fs, can also be expressed as s(t) using the following equation:

$$s(t) = e^{j2\pi(f_0 t + 0.5\gamma t^2)}$$

where,
s is the transmission signal,
t is the fast time (also known as sampling time),
$f_0$ is a starting frequency of the FMCW signal, and
γ is the chirp slope rate.

In FMCW radar, the reception signal, referred to above as fr, can also be expressed as x(I, t) using the following equation:

$$x(l, t) = \beta s(t - \tau_l) + \text{others with } \tau_l = \frac{2(r_0 + vlT)}{c}$$

where,
x is the reception signal,
I is the chirp index,
β is the amplitude of the reception signal,
t is the fast time (also known as sampling time),
$T_l$ is the round trip delay of a radar pulse,
$r_0$ is the initial distance of the target from the radar system at the beginning of the chirp interval,
v is the velocity of the target relative to the radar system,
T is the chirp duration,
c is the speed of light, and
"others" represent clutter and noise.

The output of the mixer (122 in FIG. 1) after being sampled by the ADC (108 in FIG. 1) can be expressed as y(I, t) using the following equation:

$$y(l, t) \approx \beta e^{j4\pi\frac{(f_0+\gamma t)r_0}{c}} e^{j2\pi\frac{2f_0}{c}vlT} + \text{others}.$$

Radar processing can occur over a number N of consecutive radar pulses, so long as they are within the same coherent processing interval (CPI). The pulse index is referred to as the "slow" time. The number L of radar samples collected during a pulse repetition interval (PRI) are binned, which corresponds to the range. The sample index within a PRI is also referred to as the "fast" time. Doppler processing can be performed across N samples in L range bins.

The above described equation for the signal y(I, t) is an example of a data model for the received signal (and more specifically, the signal output of the mixer, e.g., 122 in FIG. 1 after being sampled by the ADC 108), which data model describes the received signal as a function of a target's distance and velocity (relative to the radar system 102). Use of the above described data model works fine for RD processing, so long as the velocity of the target relative to the radar system remains substantially constant over the CPI. In other words, this conventional data model works fine so long as the target stays in a same range bin over the duration of the CPI. However, as will be described below, use of the above described data model can lead to some problems if the assumption (that velocity of the target relative to the radar system remains substantially constant over the CPI) is not true.

Figure 2A:
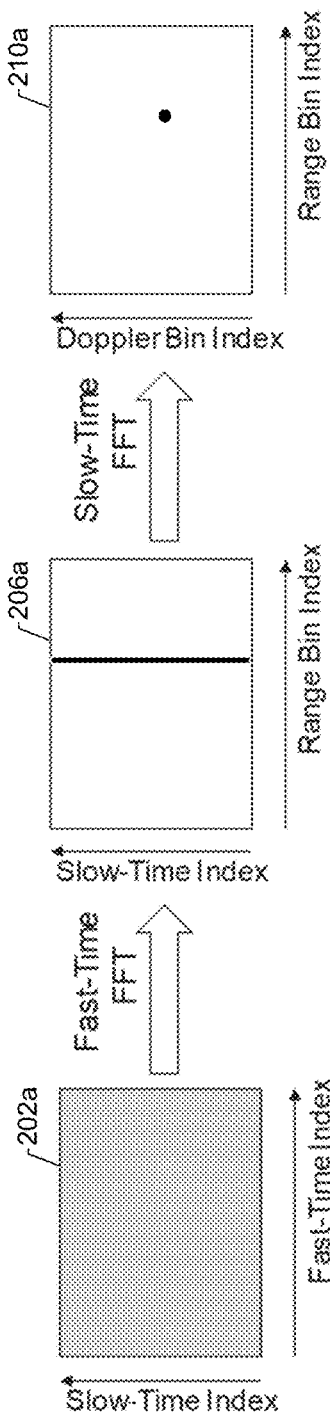
FIG. 2A includes three two-dimensional (2D) matrixes that are used to describe standard Range-Doppler (RD) processing.
Figure 2B:
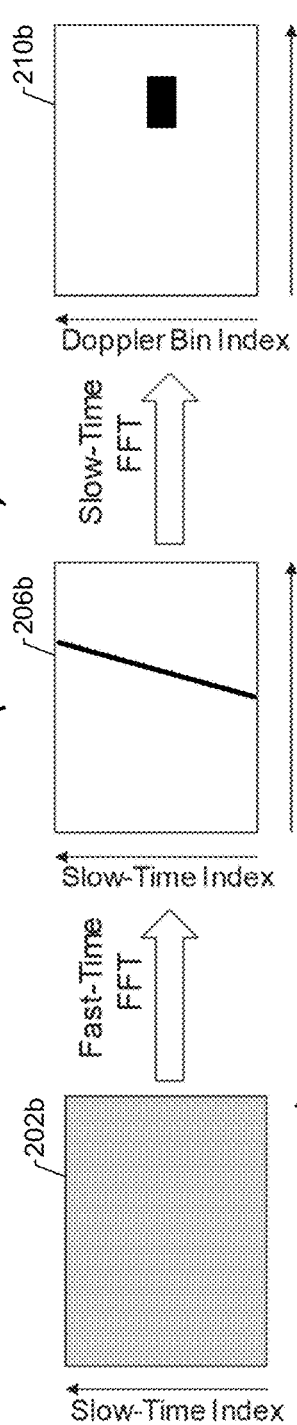
FIG. 2B includes three 2D matrixes that are used to describe a range walking problem that can occur when using standard RD processing.
Figure 2C:
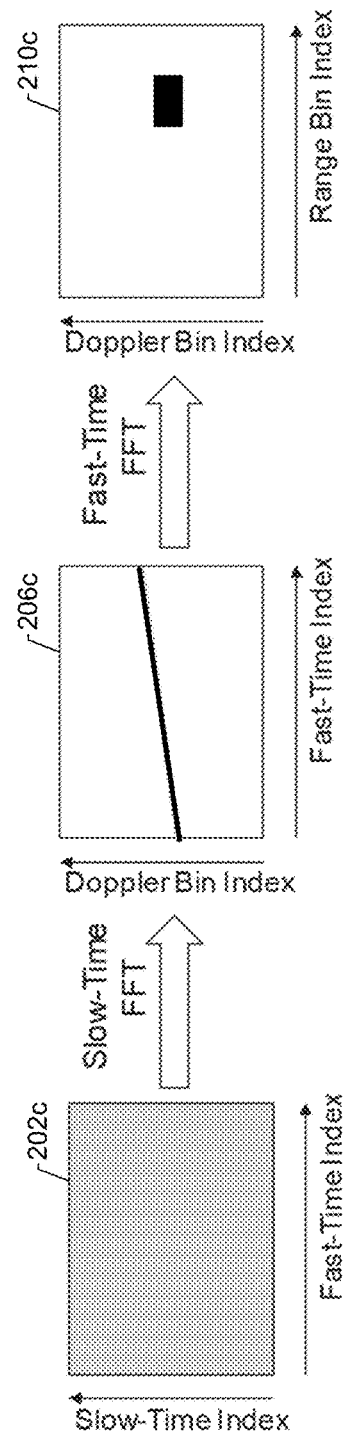
FIG. 2C includes three 2D matrixes that are used to describe a Doppler spreading problem that can occur when using standard RD processing.

FIGS. 2A, 2B, and 2C will now be used to described how an FMCW radar system (e.g., 102) conventionally performs Range-Doppler processing, using the assumptions that sweeping bandwidth is narrow band, and the target is moving slow relative to the FMCW radar system.

Referring to FIG. 2A, at the left is shown a two-dimensional (2D) matrix 202a including a slow-time index and a fast-time index. This 2D matrix 202a corresponds to the beat signal (output from the mixer 122 of the receiver 106 in FIG. 1) after the beat signal has been sampled (by the ADC 108) and a coherent processing interval (CPI) worth of time-domain data resulting from the sampling is organized (e.g., by the microcomputer 110) into the 2D matrix 202a including the fast-time index and the slow-time index. The slow-time index can also be referred to as the chirp index, and the fast-time index can also be referred to as the sample index. The slow-time index (aka the chirp index) can be numbered, e.g., from 0 to 199, with each row corresponding to a separate chirp interval. The fast-time index (aka the sample index) can be numbered, e.g., from 0 to 499, with each column corresponding to a separate sample produced by the ADC 108 during a chirp interval. Since the slow-time data and the fast-time data of the 2D matrix 202a is time-domain data, the 2D matrix 202a can also be referred to as a time-domain signal matrix.

The slow-time data (aka the chirp data), which contains time-domain data, is converted to frequency-domain data by performing a Fast Fourier Transform (FFT) for each row, which results in the 2D matrix 206a shown in the middle in FIG. 2A. For example, if the 2D matrix 202a at the left in FIG. 2A includes 200 rows, then 200 FFTs are performed, one for each row. Where an FFT is performed to convert all the samples within a same slow-time index to the frequency domain, the FFT can be referred to as a Fast-Time FFT (since the FFT is combining fast time samples). That is why the arrow between the representation 202a at the left in FIG. 2A and the representation 206a at the middle of FIG. 2A is labeled "Fast-Time FFT". Performing the Fast-Time FFT converts the fast-time index to a Range Bin (RB) index, with each bin corresponding to a different distance (aka range) between the radar system and the target. In other words, a Fast-Time FFT is performed on the 2D matrix 202a shown at the left to thereby convert the fast-time index to an RB index and thereby produce a 2D matrix 206a having the RB index and the slow-time index, as represented in the middle in FIG. 2A.

After the Fast-Time FFT is performed, resulting in the 2D matrix 206a at the middle in FIG. 2A, the 2D matrix 206a in the middle in FIG. 2A is converted to the 2D matrix 210a at the right in FIG. 2A, by performing an FFT for each column. For example, if the 2D matrixes 202a and 206a at the left and middle in FIG. 2A include 500 columns, then 500 FFTs are performed, one for each column. Where an FFT is performed to convert all the time domain samples within a slow-time index to the frequency domain, the FFT can be referred to as a Slow-Time FFT (since the FFT is combining slow time samples). That is why the arrow between the 2D matrix 206a at the middle in FIG. 2A and the 2D matrix at the right in FIG. 2A is labeled "Slow-Time FFT". Performing the Slow-Time FFT converts the slow-time index to a Doppler bin index, with each bin corresponding to a different Doppler frequency shift.

In the standard RD processing represented in FIG. 2A, Range processing and Doppler processing are decoupled, thereby enabling the use of a simple two-dimensional (2D) FFT. In FIG. 2A, the Fast-Time FFT was applied first, followed by the Slow-Fime FFT. However, it is noted that this order can be reversed to provide the same results when performing standard RD processing. In other words, the Slow-Time FFT can be performed first, followed by the Fast-Time FFT. Standard RD processing can also be referred to herein as conventional RD processing. In other words, the terms "standard" and "conventional" are used interchangeably herein.

As can be appreciated from FIG. 2A, the results of the Fast-Time FFT enables a distance to the target relative to the radar system to be determined, and the results of the Slow-Time FFT enables a velocity of the target relative to the radar system to be determined. Such standard RD processing works well if the velocity of the target relative to the radar system remains substantially constant over the CPI (i.e., over the slow-time). An exemplary CPI is 20 milliseconds (ms), in which case each sample time can be, e.g., 50 microseconds (μs). However, as will be explained below with reference to FIG. 2B, such standard RD processing causes a range-walking problem if the velocity of the target 116 relative to the radar system 102 varies over the CPI (i.e., over the slow time). More specifically, when the target range variation is larger than the range resolution, the range walking problem occurs, which is illustrated in FIG. 2B.

The 2D matrixes 202b, 206b and 210b (at the left, middle, and right) in FIG. 2B represent the same type of data as the 2D matrixes 202a, 206a and 210a, respectively, do in FIG. 2A, and thus, need not be described in the same amount of detail again. In FIGS. 2A and 2B (and also FIG. 2C), the rightmost 2D matrix (210a, 210b, and 210c) that has a Doppler bin index and a Range bin index can also be referred to as a Range Doppler (RD) image. In contrast to FIG. 2A, in FIG. 2B that target range variation is larger than the range resolution, which results in a slanted vertical line in the 2D matrix 206b, in contrast to the straight up-and-down vertical line in the 2D matrix 206a in FIG. 2A. This slanting indicates range ambiguity. After performing the slow-time FFT, this then results in a blurred point-target in the RD image 210b shown at the right in FIG. 2B, which causes low signal-to-noise ratio (SNR), and poor range and velocity estimation. The same results would occur if the order of the fast-time FFT and the slow-time FFT were reversed, due to what is known as the Doppler spreading problem, as described below with reference to FIG. 2C. More specifically, FIG. 2C illustrates what happens if the slow-time FFT is first performed, followed by the fast-time FFT being performed.

The 2D matrixes 202c (at the left) in FIG. 2C represents the same type of data as the 2D matrix 202a in FIG. 2A, and thus, need not be described in the same amount of detail again. The 2D matrix 206c shown in the middle in FIG. 2C, which results from performing the Slow-Time FFT (where the target range variation is larger than the range resolution), includes a slanted horizontal line, which slanting corresponds to a Doppler ambiguity. After performing the Fast-Time FFT, this then results in a blurred point-target in the RD image 210c shown at the right in FIG. 2C, which causes low SNR, and poor range and velocity estimation, as was also the case in FIG. 2B.

FIGS. 3A and 3B are further graphs used to illustrate the Range ambiguity and Doppler ambiguity problems that occur when an FMCW radar system (e.g., 102) performs standard RD processing, using the assumptions that sweeping band is narrow band, and the target is moving slow relative to the FMCW radar system. In other words, FIGS. 3A and 3B are used to illustrate the Range ambiguity and Doppler ambiguity problems when the target range variation is larger than the range resolution, and the Doppler variation is larger than the Doppler resolution. FIG. 3A, which is a graph of range (in meters) versus velocity (in meters per second), shows the range spreading that occurs, which in this example causes the radar system to at best determine that the target is between about 50 meters and 50.5 meters from the radar system. FIG. 3B, which is a graph of velocity (in meter per second) versus magnitude (in dB), shows the velocity spreading problem that occurs, which causes the radar system to calculate that the velocity of the target (relative to the radar system) is one of −70 meters per second (m/s), −10 m/s, 50 m/s, or 110 m/s, each of which can be referred to as a potential velocity. A negative velocity means the target is moving away from the radar system, and a positive velocity means that the target is moving toward the radar system. As can be appreciated from FIG. 3B and the description thereof, the Doppler ambiguity problem causes a need to select between multiple potential velocities (including whether the target is moving towards or away from the radar system).

In accordance with certain embodiments of the present technology, a more accurate data model is used for the received signal y(l, t) of a radar system (and more specifically, the signal output of the mixer, e.g., 122 in FIG. 1 after it is sampled by the ADC 108), which more accurate data model more accurately describes the sampled received signal as a function of a target's distance and velocity (relative to the radar system). More specifically, in accordance with certain embodiments of the present technology, the output of the mixer (122 in FIG. 1) after being sampled by the ADC (108 in FIG. 1) can be expressed as y(l, t) using the following equation:

$$y(l, t) = s(t) \ x^*(l, t) \approx \beta e^{j4\pi \frac{(f_0+\gamma t)(r_0+vlT)}{c}} + \text{others}.$$

Further, the instantaneous frequency at the fast-time t can be expressed using the following equation:

$$f=f_0+\gamma t$$

Comparing the more accurate data model just introduced above to the conventionally (aka standard) data model discussed further above, it can be appreciated that the conventional data model did not include the phase term 4πγtvlT/c, which phase term is included in the more accurate data model. Such embodiments, as will be described below, can be used to avoid or at least reduce the Doppler and Range ambiguity problems that occur when using the conventional data model. In accordance with certain embodiments, the avoidance or at least reduction in the Doppler and range ambiguity problems is at least in part due to the inclusion of the phase term 4πrγtvlT/c in the data model that is used.

In accordance with certain embodiments of the present technology, the more accurate data model, which can also be referred to as the improved data model, can be used to more accurately determine the distance and velocity of a target relative to a radar system. A method or technique for estimating the target's distance and velocity is derived from a received signal, based on the data model. More specifically, such embodiments involve performing a Slow-Time FFT, followed by performing a Doppler interpolation, followed by performing a Fast-Time FFT, which provides for a fast implementation of certain embodiments of the present technology. Such embodiments can be appreciated from FIG. 4, which will now be discussed.

Figure 4:
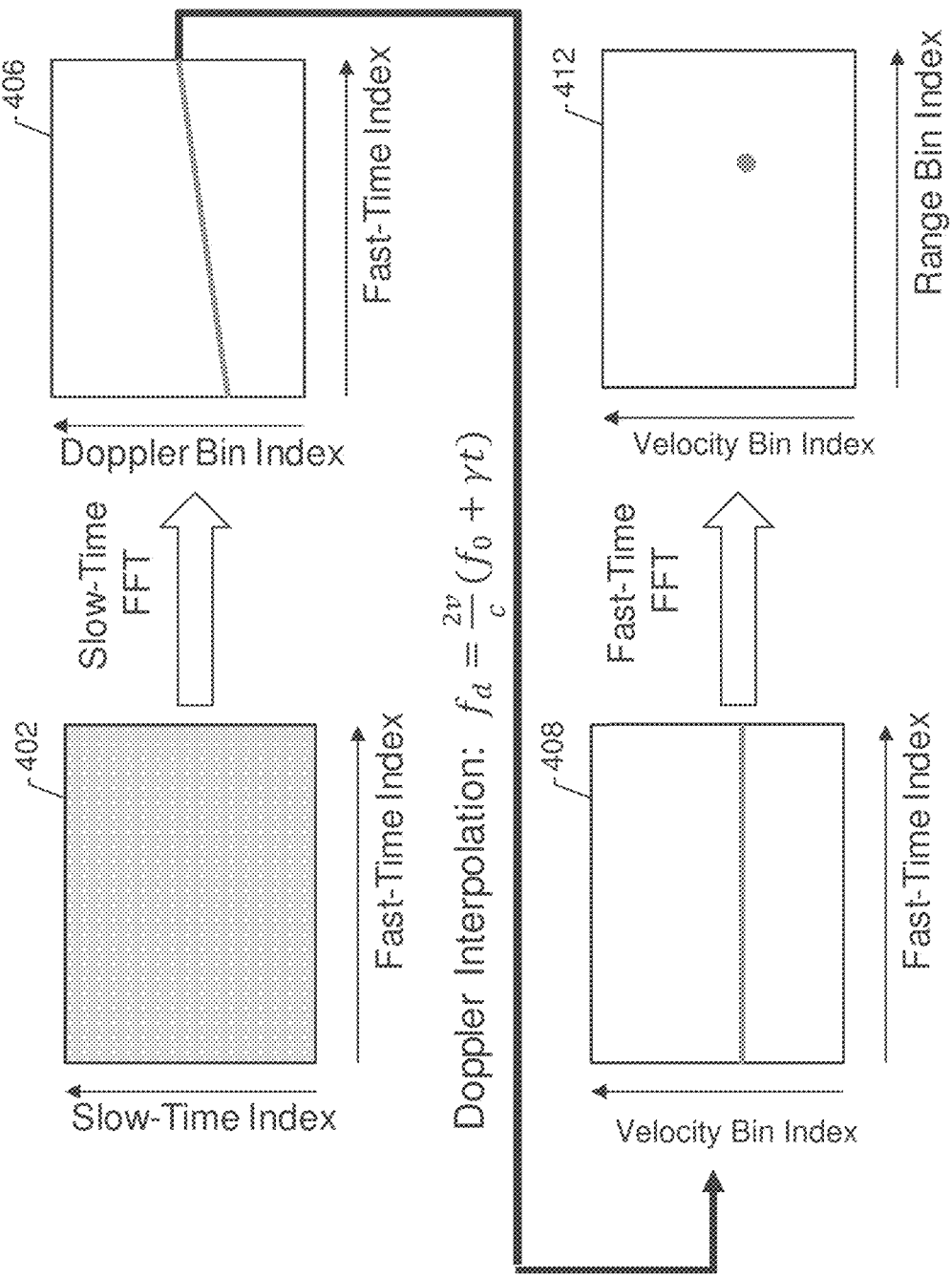
FIG. 4 includes four 2D matrixes that are used to describe range velocity (RV) processing according to certain embodiments of the present technology.

Referring to FIG. 4, the 2D matrix 402 at the upper left represents the output of the mixer 122 of the receiver 106 in FIG. 1 after it has been sampled by the ADC 108 and a CPI worth of time-domain data has been organized into the 2D matrix. As was explained above with reference to FIG. 1, the output of the mixer can be amplified by the amplifier 124 and then converted to a digital signal by the ADC 108 before being provided to the microcomputer 110. Additionally, as was mentioned above, filtering can also be performed prior to the sampling by the ADC 108.

The 2D matrix 402 at the upper left in FIG. 4, is partially converted to frequency domain data by performing a Fast Fourier Transform (FFT) for each column, which results in the 2D matrix 406 in the upper right in FIG. 4. Where an FFT is performed to convert all the samples within a same fast-time index to the frequency domain, the FFT can be referred to as a Slow-Time FFT (since the FFT is combining slow time samples). That is why the arrow between the 2D matrix 402 at the upper left in FIG. 4 and the 2D matrix 406 at the upper right of FIG. 4 is labeled "Slow-Time FFT". Performing the Slow-Time FFT converts the slow-time index to a Doppler bin index, with each bin corresponding to a different Doppler frequency shift.

After the Slow-Time FFT is performed, resulting in the 2D matrix 406 at the upper right in FIG. 4, the 2D matrix 406 in the upper right in FIG. 4 is converted to the 2D matrix at the lower left in FIG. 4 by performing a Doppler interpolation that removes Range ambiguity and Doppler ambiguity. More specifically, a one-dimensional (1D) interpolation is performed along the Doppler bin index to thereby convert the Doppler bin index to a Velocity bin index (with each bin corresponding to a different velocity of the target relative to the radar system), and thereby produce a 2D matrix having a Velocity bin index and a fast-time index, as represented in the lower left in FIG. 4. Exemplary types of interpolation that can be performed included, but are not limited to, nearest neighbor interpolation, linear interpolation, or spline interpolation.

In accordance with certain embodiments of the present technology, the 1D interpolation is performed using the following equation:

$$f_d = \frac{2v}{c}(f_0 + \gamma t).$$

where
$f_d$ is a Doppler frequency,
v is a velocity of the target relative to the radar system,
$f_0$ is a starting frequency of the FMCW signal,
$\gamma$ is a chirp slope rate,
c is the speed of light, and
t is the fast time.

The use of other equations for performing the 2D interpolation are also possible and within the scope of the embodiments described herein.

In FIG. 4, the 2D matrix 412 at the bottom right can be referred to as a 2D matrix having a Range bin index and a Velocity bin index, or as a Range Velocity (RV) image. Each bin of the Velocity bin index corresponds to a different velocity of the target relative to radar system. This is in contrast to the 2D matrixes (210a, 210b, and 210c) at the right in FIGS. 2A, 2B and 2C, which as noted above have Doppler bin index and a Range bin index, and were referred to as Range Doppler (RD) images. Each bin along a Doppler bin index corresponds to a different Doppler frequency shift, where the Doppler frequency shift differs for different frequencies of an FMCW signal. Accordingly, there is not an actual one to one correspondence between Doppler frequency shift and velocity, and thus, with the RD images each Doppler bin is not actually indicative of a different velocity of the target relative to the radar system.

Figures 5A, 5B:
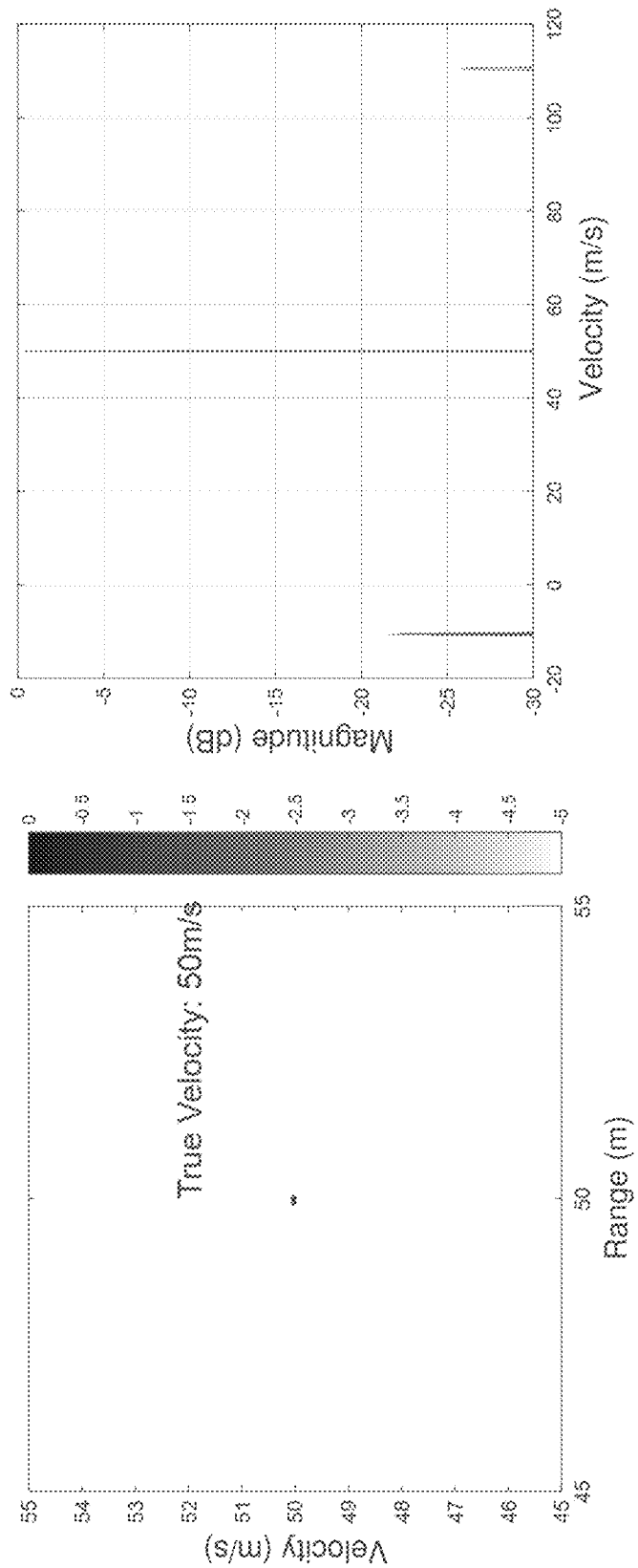
FIG. 5A is a graph of range and velocity illustrating that embodiments of the present technology can be used to avoid the range ambiguity problem that can occur when using standard RD processing.
FIG. 5B is a graph of velocity and magnitude illustrating that embodiments of the present technology can be used to avoid the velocity ambiguity problem that can occur when using standard RD processing.

FIGS. 5A and 5B are further graphs that can be used to illustrate that the Range ambiguity and Doppler ambiguity problems are avoided using embodiments of the present technology. FIG. 5A, which is a graph of range (in meters) versus velocity (in meters per second), shows that the range spreading (shown in FIG. 3A) is avoided. FIG. 5B, which is a graph of velocity (in meter per second) versus magnitude (in dB), shows the velocity spreading problem is also avoided, because the magnitude corresponding to the velocity of 50 m/s is significantly greater than the magnitudes at −10 m/s and 110 m/s. The Range Velocity (RV) processing of embodiments of the present technology described above and summarized below with reference to the high level flow diagram of FIG. 6, can be used to provide an improvement of about 9 dB over standard RD processing.

Figure 6:
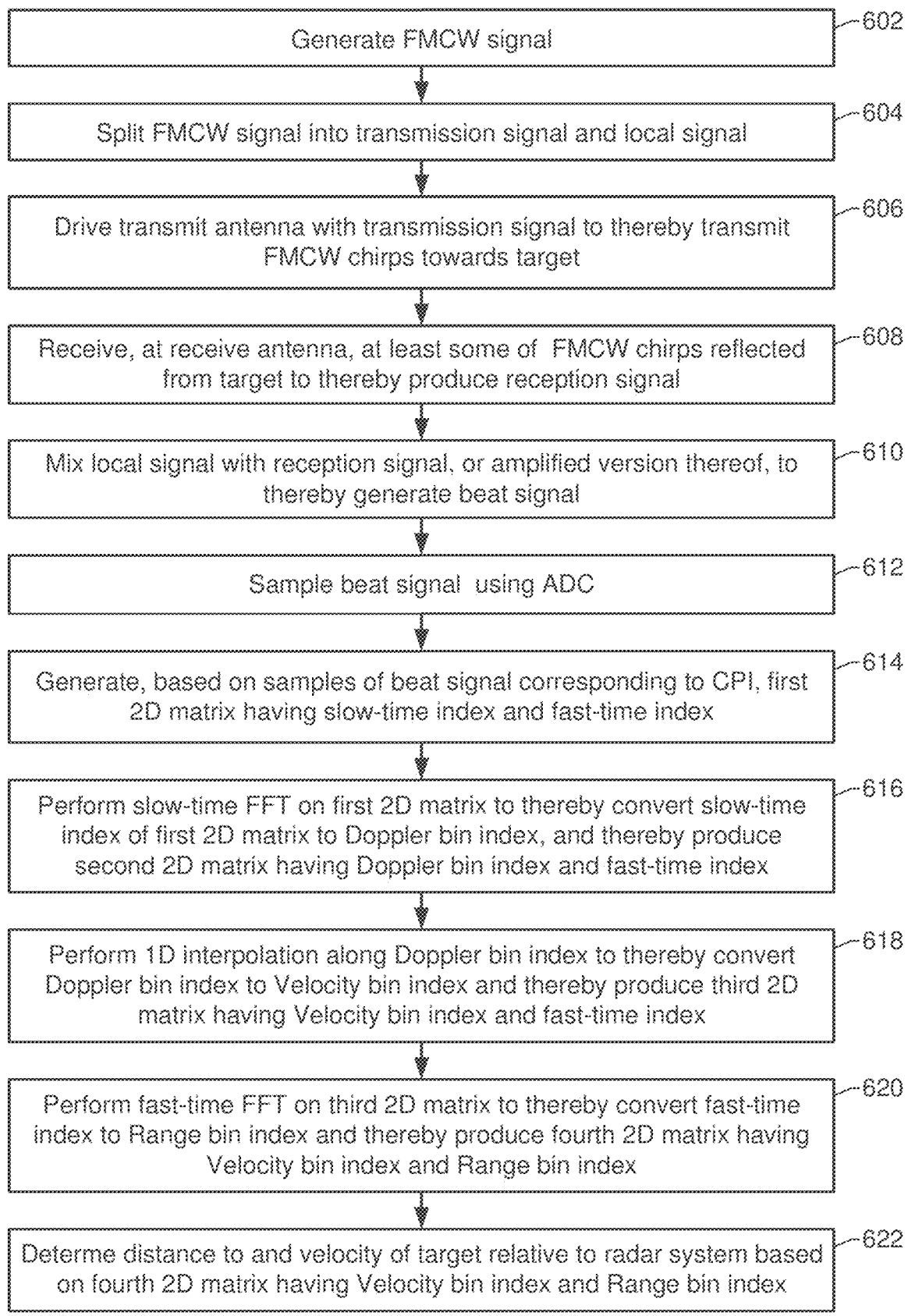
FIG. 6 is a high level flow diagram that is used to summarize methods for use with FMCW radar systems according to certain embodiment of the present technology.

The high level flow diagram of FIG. 6 will now be used to summarize certain embodiments of the present technology, which are for use by a radar system, such as the radar system 102 described above with reference to FIG. 1. Further, as will be described in additional detail below, e.g., with reference to FIG. 7, such embodiments can also be used with multiple-input and multiple-output (MIMO) radar systems. However, when initially describing FIG. 6, reference will often be made to the radar components in FIG. 1, as well as to the various 2D matrixes in FIG. 4.

Referring to FIG. 6, step 602 involves generating a frequency modulated continuous waveform (FMCW) signal, step 604 involves splitting the FMCW signal into a transmission signal and a local signal, and step 606 involves driving a transmit antenna with the transmission signal to thereby transmit a plurality of FMCW chirps towards a target. Referring briefly back to FIG. 1, step 602 can be performed by the waveform generator 112 under controller of one or more processor of the MC 110, step 604 can be performed by the splitter 114, and step 606 can be performed using the transmit antenna 118, and optionally using an amplifier, not shown, that is in the signal path between the waveform generator 112 and the transmit antenna 118. At least some of the FMCW chirps that are transmitted toward the target at step 606 will be reflected back towards a receive antenna.

Referring again to FIG. 6, step 608 involves receiving, at a receive antenna, at least some of the FMCW chirps (that were transmitted towards the target and were reflected back therefrom towards the receive antenna) to thereby produce a reception signal. Step 610 involves mixing the local signal with the reception signal to thereby generate a beat signal. Step 612 involves sampling the beat signal using an analog-to-digital converter (ADC). Referring briefly back to FIG. 1, step 608 can be performed using the receive antenna 120, step 610 can be performed using the mixer 122, and step 612 can be performed by the ADC 108 under the control of one or more processors of the MC 110. As shown in FIG. 1, the beat signal that is produced by the mixer 122 can be amplified by the amplifier 124 within the signal path between the mixer 122 and the ADC 108, before being sampled by the ADC 108.

Referring again to FIG. 6, step 614 involves generating, based on samples of the beat signal corresponding to a coherent processing interval (CPI), a first two-dimensional (2D) matrix having a slow-time index and a fast-time index. An example of the 2D matrix generated at step 614 is the 2D matrix 402 illustrated at the upper left in FIG. 4. Step 616 in FIG. 6 involves performing a slow-time FFT on the first 2D matrix to thereby convert the slow-time index of the first 2D matrix to a Doppler bin index, and thereby produce a second 2D matrix having the Doppler bin index and the fast-time index. An example of the 2D matrix generated at step 616 is the 2D matrix 406 illustrates in the upper right in FIG. 4. After the slow-time FFT is performed at step 616, step 618 involves performing a 1D interpolation along the Doppler bin index to thereby convert the Doppler bin index to a Velocity bin index and thereby produce a third 2D matrix having a Velocity bin index and a fast-time index. An example of the 2D matrix generated at step 618 is the 2D matrix 408 shown at the lower left in FIG. 4. After the 1D interpolation is performed at step 618, step 620 involves performing a fast-time FFT on the third 2D matrix to thereby convert the fast-time index to a Range bin index and thereby produce a fourth 2D matrix having the Velocity bin index and a Range bin index. An example of the 2D matrix generated at step 620 is the 2D matrix 412 shown at the lower right in FIG. 4. Finally, step 622 involves determining the distance to and the velocity of the target relative to the radar system based on the fourth 2D matrix having the Velocity bin index and the Range bin index. Referring to the 2D matrix at the lower right in FIG. 4, it can be appreciated that by using such embodiments of the present technology, the point-target therein is not blurred, thereby providing for a high SNR and avoiding Range ambiguity and Velocity ambiguity. Any one of a variety of different known techniques can be used to determine distance and velocity from a RD image can be used to determine distance and velocity from an RV images, such as but no limited to, constant false alarm rate (CFAR) detection techniques, wherein CFAR detection techniques use an adaptive algorithm to detect target returns against a background of noise, clutter and interference.

Steps 602, 604, and 606 collectively and more generally involve driving a transmit antenna with a modulated transmission signal to thereby transmit a plurality pulses towards a target. In the FMCW radar embodiments summarized with reference to FIG. 6, the modulated transmission signal is an FMCW signal, and the pulses that are transmitted toward the target are FMCW chirps. In other embodiments of the present technology, described later on below, the modulated transmission signal is instead an orthogonal frequency-division multiplexing (OFDM) signal. Step 608 more generally involves receiving, at a receive antenna, at least some of the plurality of the pulses that are transmitted towards and reflected from the target. Steps 610 and 612 collectively and more generally involve processing the received pulses, including performing demodulation and sampling thereof, to produce a plurality of samples indicative of the received plurality of pulses. Further, step 614 more generally involves generating, based on a set of the samples corresponding to a CPI, a first 2D matrix having a slow-time index and a fast-time index. In the FMCW embodiments summarized with reference to FIG. 6, the slow-time index is a chirp index, and the fast-time index is a sample index. In the OFDM embodiments, described later on below, the slow-time index is instead a symbol index, and the fast-time index is instead a subcarrier index.

Figure 7:
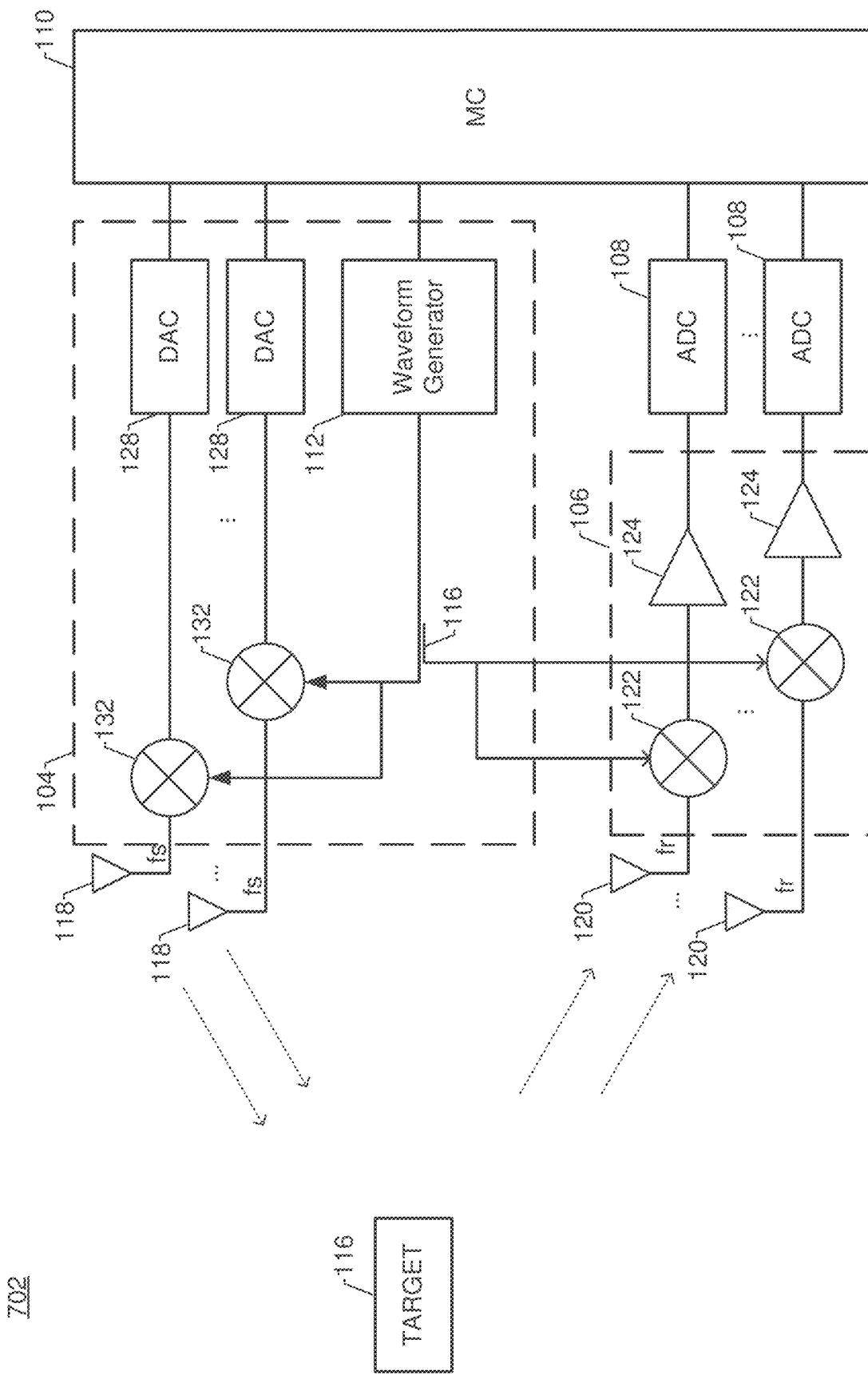
FIG. 7 illustrates an exemplary MIMO FMCW radar system with which certain embodiments of the present technology can be implemented.

The radar system 102 described above with reference to FIG. 1 was shown as including a single transmit antenna 118 and a single receive antenna 120. Embodiments of the present technology can also be used with multiple-input and multiple-output (MIMO) radar systems including a plurality of (i.e., multiple) transmit antennas 118 and a plurality of (i.e., multiple) receive antennas 120. An example of such a MIMO radar system 702 is shown in FIG. 7, which more specifically is an FMCW radar system. The transmitter 104 of the MIMO radar system 702 is shown as including a waveform generator 112, a plurality of DACs 128, and a plurality of mixers 132. The MC 110 can provide digital signals to the DACs 128, which convert the digital signals to analog signals before such signals are mixed by the mixers 132 with the RF signal (and more specifically, the FMCW signal) produced by the waveform generator 112, to thereby produce a plurality of transmission signals fs, each of which drives one of the transmit antennas 118. The digital signals produced by the MC 110, which are provided to the DACs 128, can be used to implement any one of a plurality of different types of MIMO modulation schemes, included, but not limited to, Doppler Division Modulation (DDM) in slow-time, Code Division Modulation (CDM) in slow-time, Frequency Divisional Modulation (FDM) in fast-time, or Time Divisional Modulation (TDM) in slow-time. The number of receive antennas 120 in the MIMO radar system 702 can be the same or different than the number of transmit antennas 118. With DDM, the transmission signals transmitted by different transmit antennas will each have a different Doppler modulation. With CDM, the transmission signals transmitted by different transmit antennas will each have a different modulation code. With FDM, the transmission signals transmitted by different transmit antennas will each have a different modulation frequency.

When using MIMO radar that includes m transmit antennas, and n receive antennas, for each of the n receive antennas a separate Range Velocity (RV) image (i.e., a 2D matrix having a Velocity bin index and the Range bin index) will be produced for each of the m transmit antennas. This leads to a total of m*n RV images being produced. For example, if there are two transmit antennas 118, and four receive antennas 120, then for each of the four receive antennas 120 two RV image will be produced, resulting in a total of eight RV images being produced. From the multiple RV images, the distance to and velocity of a target relative to the MIMO radar system can be determined. Additionally, an angle of the target (e.g., azimuth angle and/or an elevation angle) relative to the MIMO radar system can be determined from the multiple RV images. Any one of a variety of different known techniques can be used to determine angles from the multiple RD image, such as but not limited to, digital beamforming, angle FFT, and MUSIC (multiple signal classification) algorithms.

When using Doppler Division Modulation (DDM) in slow-time, the output of each of the mixers 122 in FIG. 7, after being sampled by a respective one of the ADCs 108 in FIG. 7, can be expressed as y(I, t) using the following equation or data model:

$$y_m(l, t) = \sum_n \beta_{m,n} e^{j4\pi \frac{(f_0+\gamma t)(r_0+vlT)}{c}} e^{j2\pi f_{mod,n} lT} + \text{others}$$

In the above equation, m is the receive antenna index, and n is the transmit antenna index, and $\beta_{m,n}$ is the amplitude of the reception signal of the mth receive antenna, for the nth transmit antenna, where $\beta_{m,n}$ can be calculated as follows:

$$\beta_{m,n}(r, f_d) = \sum_{t,l} y_m(l, t) e^{-j4\pi \frac{(f_0+\gamma t)(r_0+vlT)}{c}} e^{-j2\pi f_{mod,n} lT}$$

$$= \sum_f e^{-j4\pi \frac{(f_0+\gamma t)r_0}{c}} \sum_l y(l, t) e^{-j2\pi \left(\frac{2v(f_0+\gamma t)}{c} + f_{mod,n}\right) lT}$$

-continued $$= \sum_f e^{-j4\pi \frac{(f_0+\gamma t)r_0}{c}} [\tilde{Z}_n(v, t)]$$

where, $$\tilde{Z}_n(v, t) = Y\left(\frac{2v(f_0 + \gamma t)}{c} + f_{mod,n}, t\right),$$

$Y(\omega, t) = \sum_l y(l, t) e^{-j2\pi \omega l/T}$ and
$f_{mod,n}$ is the Doppler modulation frequency for nth transmit antenna (TX).

In accordance with certain embodiments of the present technology, the data model introduced above, can be used to accurately determine the distance to and velocity of a target relative to a MIMO radar system. A method or technique for estimating the target's distance and velocity is derived from signals received at multiple receive antennas, based on the data model. More specifically, such embodiments involve for each receive antenna, performing a slow-time FFT, followed by performing a 1D Doppler interpolation, followed by performing a fast-time FFT, which results in a separate Range Velocity (RV) image for each transmit antenna. In other words, a separate RV image is produced for each different pair-combination of transmit and receive antennas.

Referring again to FIG. 7, each of the plurality of transmit antennas 118 is driven by a respective transmission signal (fs), as can be appreciated from FIG. 7. Each of the plurality of receive antennas 120 produces a respective reception signal (fr), as can also be appreciated from FIG. 7. Each of the plurality of reception signals (fr) is mixed with a local signal (produced using the splitter 116) to produce a respective beat signal. Each of the beat signals is sampled using a respective ADC 108 to thereby generate, based on samples of each of the beat signals corresponding to a CPI, a respective first 2D matrix having a slow-time index and a fast-time index, a representation of which is shown at the upper left in FIG. 8.

Figure 8:
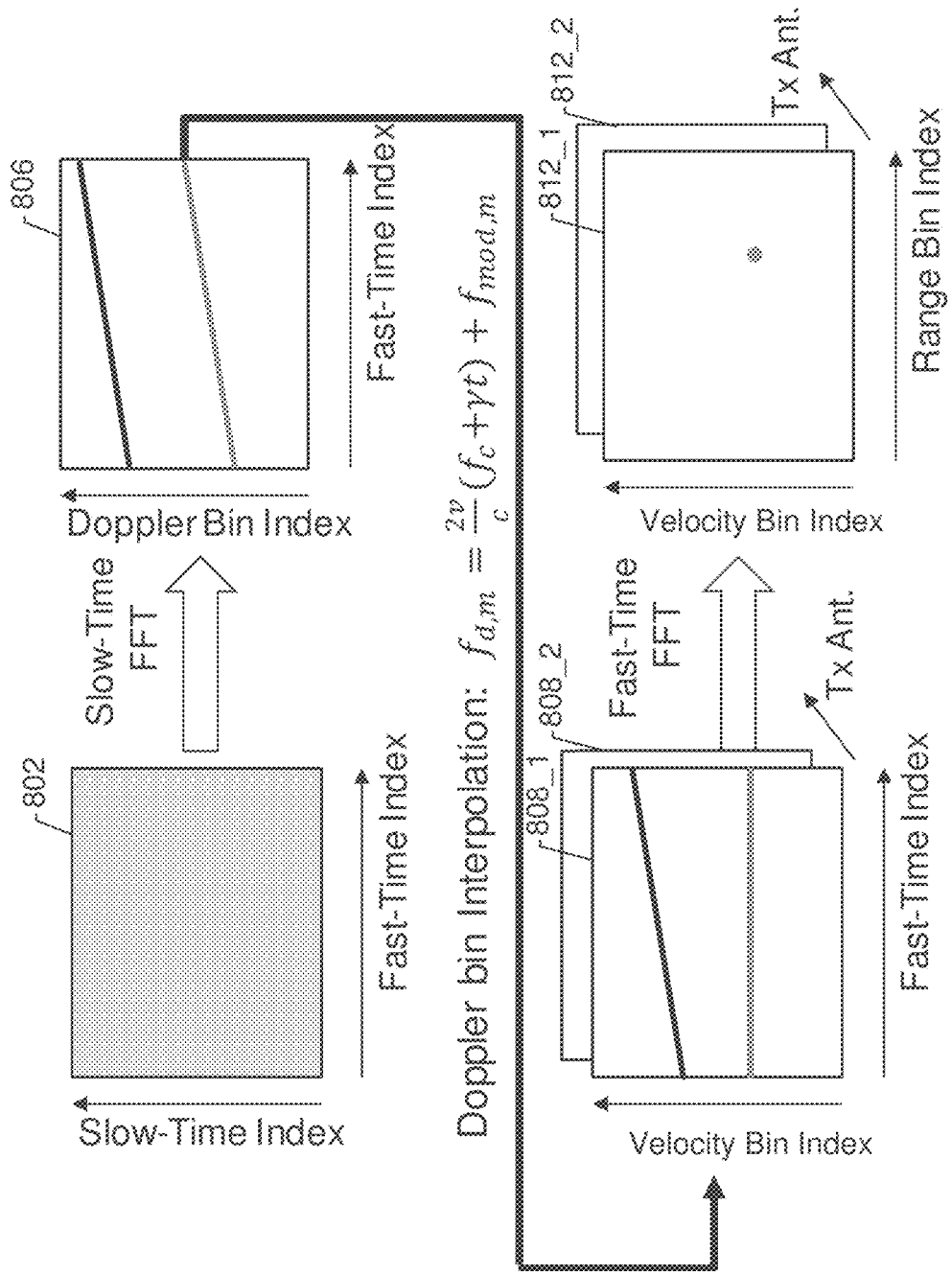
FIG. 8 includes multiple 2D matrixes that are used to describe range velocity (RV) processing, for use with a MIMO FMCW radar system, according to certain embodiments of the present technology in which Doppler Division Modulation (DDM) in slow-time was used to modulate the transmission signals.

Still referring to FIG. 8, in accordance with certain embodiments, a slow-time FFT is performed on each of the first 2D matrixes (e.g., 802) to thereby convert the respective slow-time index of each of the first 2D matrixes to a respective Doppler bin index, and thereby produce a respective second 2D matrix 802 (e.g., 806) having the Doppler bin index and the fast-time index, an example of which is shown at the upper right in FIG. 8.

After performing the slow-time FFTs, for each of the second 2D matrixes (e.g., 806) having the Doppler bin index and the fast-time index, a respective 1D interpolation is performed to thereby convert the Doppler bin index to a Velocity bin index, and thereby produce a respective third 2D matrix (e.g., 808_1 and 802_2) having a Velocity bin index and a fast-time index, examples of which are shown at the lower left in FIG. 8.

After performing the 1D interpolations, for each of the third 2D matrixes having a Velocity bin index and a fast-time index, a fast-time FFT is performed on the third 2D matrixes to thereby convert the fast-time index to a Range bin index, to thereby produce a respective fourth 2D matrix (e.g., 812_1 and 812_2) having the Velocity bin index and a Range bin index, examples of which are shown at the lower right in FIG. 8. Thereafter, the distance to and the velocity of the target relative to the radar system is determined based on the plurality of fourth 2D matrixes having the Velocity bin index and the Range bin index, which can also be referred to as Range Velocity (RV) images. Additionally, an angle of the target (e.g., azimuth angle and/or an elevation angle) relative to the MIMO radar system can be determined from the multiple RV images.

Still referring to FIG. 8, two slanted lines are shown in the second 2D matrix (having the Doppler bin index and the fast-time index), wherein each of the slanted lines corresponds to the portion of the receive signal associated with a different one of two transmit antennas 118. One of the slanted lines is converted to a straight line using a 1D interpolation, as shown in the third 2D matrix 808_1 (having the Velocity bin index and the fast-time index) shown at the lower left in FIG. 8. A separate 1D interpolation is performed for the other slanted line to similarly straighten the line in another third 2D matrix (having the Velocity bin index and the fast-time index) represented in the image 808_2 shown behind the front most image 808_1 shown at the lower left in FIG. 8.

In accordance with certain embodiments of the present technology, assuming the MIMO radar system includes m transmit antennas (where m is an integer that is greater than or equal to 2), each of the 1D interpolations is performed using the following equation:

$$f_{d,m} = \frac{2v}{c}(f_0 + \gamma t) + f_{mod,m},$$

where
$f_{d,m}$ is a Doppler frequency for an m-th transmit antenna,
v is a velocity of the target relative to the radar system,
$f_0$ is a starting frequency of the FMCW signal,
γ is a chirp ramp slope,
c is the speed of light,
t is the fast time, and
$f_{mod,m}$ is a modulated Doppler Frequency for the m-th transmit antenna.

Figure 9:
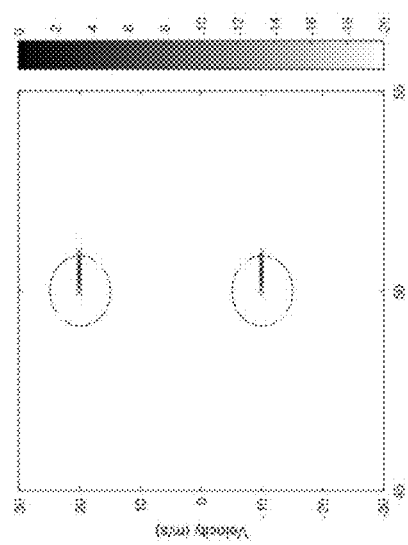
FIG. 9 is a graph of range and velocity illustrating that range doppler spreading that occurs when standard RD processing is performed with a MIMO radar system.
Figure 10:
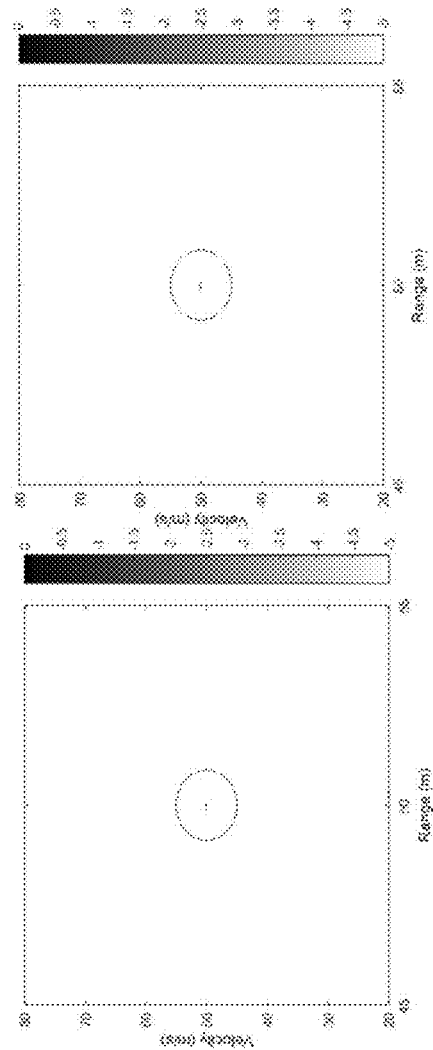
FIG. 10 includes two graphs of range versus velocity illustrating that range doppler spreading can be avoided by using embodiments of the present technology to perform RV processing with a MIMO radar system.

FIG. 9 is a graph of range versus velocity, which shows the range doppler spreading that occurs when standard RD processing is performed with a MIMO radar system. In FIG. 9, each circled line corresponds to Range and Velocity information determined for a separate transmit antenna. FIG. 10, by contrast, includes similar graphs that show how Range spreading is avoided by using embodiments of the present technology. In FIG. 10, the circled line in the graph at the left corresponds to Range and Velocity information calculated for a first transmit antenna, and the circled line in the graph at the right corresponds to Range and Velocity information calculated for a second transmit antenna. Notice that both the left and right graphs in FIG. 10 beneficially are consistent with one another.

When using Doppler Division Modulation (DDM) in slow-time, the output of each of the mixers 122 in FIG. 7, after being sampled by a respective one of the ADCs 108 in FIG. 7, can be expressed as y(I, t) using the following equation or data model:

$$y_m(l, t) = \sum_n \beta_{m,n} e^{j4\pi \frac{(f_0+\gamma t)(r_0+vlT)}{c}} e^{j2\pi f_{mod,n} lT} + \text{others}.$$

In the above equation, m is the receive antenna index, and n is the transmit antenna index, and $\beta_{m,n}$ is the amplitude of the reception signal of the mth receive antenna, for the nth transmit antenna, where $\beta_{m,n}$ can be calculated as follows:

$$\beta_{m,n}(r, f_d) = \sum_{t,l} y_m(l, t) e^{-j4\pi \frac{(f_0+\gamma t)(r_0+vlT)}{c}} e^{-j2\pi f_{mod,n} lT}$$

$$= \sum_t e^{-j4\pi \frac{(f_0+\gamma t)r_0}{c}} \sum_l y(l, t) e^{-j2\pi\left(\frac{2v(f_0+\gamma t)}{c} + f_{mod,n}\right) lT}$$

$$= \sum_t e^{-j4\pi \frac{(f_0+\gamma t)r_0}{c}} [\tilde{Z}_n(v, t)]$$

where, $$\tilde{Z}_n(v, t) = Y\left(\frac{2v(f_0+\gamma t)}{c} + f_{mod,n}, t\right),$$

$Y(w, t) = \sum_l y(l, t) e^{-j2\pi\omega lT}$, and $f_{mod,n}$ is the Doppler modulation frequency for nth transmit antenna (TX).

When using Code Division Modulation (CDM) in slow-time, the output of each of the mixers 122 in FIG. 7, after being sampled by a respective one of the ADCs 108 in FIG. 7, can be expressed as y(l, t) using the following equation or data model:

$$y_m(l, t) = \sum_n \beta_{m,n} e^{j4\pi \frac{(f_0+\gamma t)(r_0+vlT)}{c}} c_{n,l} + \text{others}.$$

In the above equation, m is the receive antenna index, and n is the transmit antenna index, and $\beta_{m,n}$ is the amplitude of the reception signal of the mth receive antenna, for the nth transmit antenna, where $\beta_{m,n}$ can be calculated as follows:

$$\beta_{m,n}(r, f_d) = \sum_{t,l} y_m(l, t) e^{-j4\pi \frac{(f_0+\gamma t)(r_0+vlT)}{c}} c_{n,l}^* =$$

$$\sum_t e^{-j4\pi \frac{(f_0+\gamma t)r_0}{c}} \sum_n [c_{n,l}^* y_m(l, t)] e^{-j2\pi \frac{2v(f_0+\gamma t)}{c} lT} =$$

$$\sum_t e^{-j4\pi \frac{(f_0+\gamma t)r_0}{c}} [\tilde{Z}_n(v, t)]$$

where, $$\tilde{Z}(v, t) = Y\left(\frac{2v(f_0+\gamma t)}{c}, t\right),$$

$$Y_n(\bar{\omega}, t) = \sum_l [c_{n,l}^* y_m(l, t)] e^{-j2\pi \frac{2v(f_0+\gamma t)}{c} lT},$$

and $c_{n,l}$ is the Spreading code for nth transmit antenna (TX).

Figure 11:
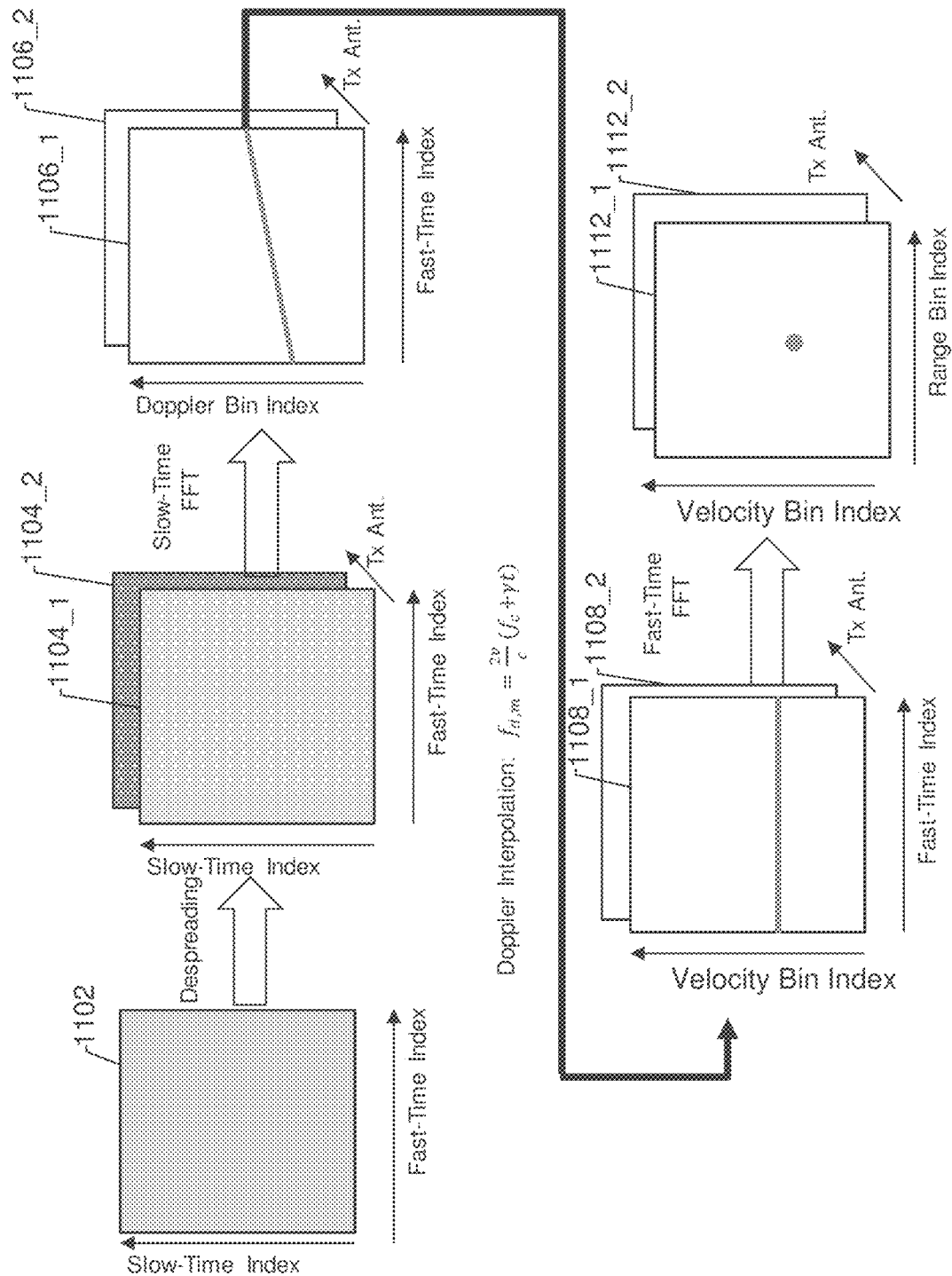
FIG. 11 includes multiple 2D matrixes that are used to describe RV processing, for use with a MIMO FMCW radar system, according to certain embodiments of the present technology in which Code Division Modulation (CDM) in slow-time was used to modulate the transmission signals.

FIG. 11 includes multiple 2D matrixes that are used to describe range velocity (RV) processing, for use with a MIMO FMCW radar system, according to certain embodiments of the present technology in which CDM in slow-time was used to modulate the transmission signals. With CDM, each separate transmission signal (transmitted by a separate respective transmit antenna 118) can be modulated using a different spreading code. After a receive antenna 120 produces a reception signal that is sampled by a respective ADC 108, the samples are organized into a 2D matrix 1102 having a slow-time index and a fast-time index. The modulation codes can then be used to de-spread the 2D matrix (that includes data for multiple transmit antennas) into a separate 2D matrix 1104_1 and 1104_2 (having a slow-time index and a fast-time index) for each of the transmit antennas. RV processing is then performed for each of these separate 2D matrixes in a similar manner as was described above with reference to FIG. 4, as can be appreciated from a comparison between FIG. 11 and FIG. 4 discussed above. Each of the 2D matrixes 1104_1 and 1104_2 is converted into a respective 2D matrix 1106_1 and 1106_2. Then 1D Doppler Interpolation is performed to covert each of the 2D matrixes 1106_1 and 1106_2 into a respective 2D matrix 1108_1 and 1108_2. Then Fast-Time FFT was performed on each of the 2D matrixes to produce respective RV images 1112_1 and 1112_2.

Figure 12:
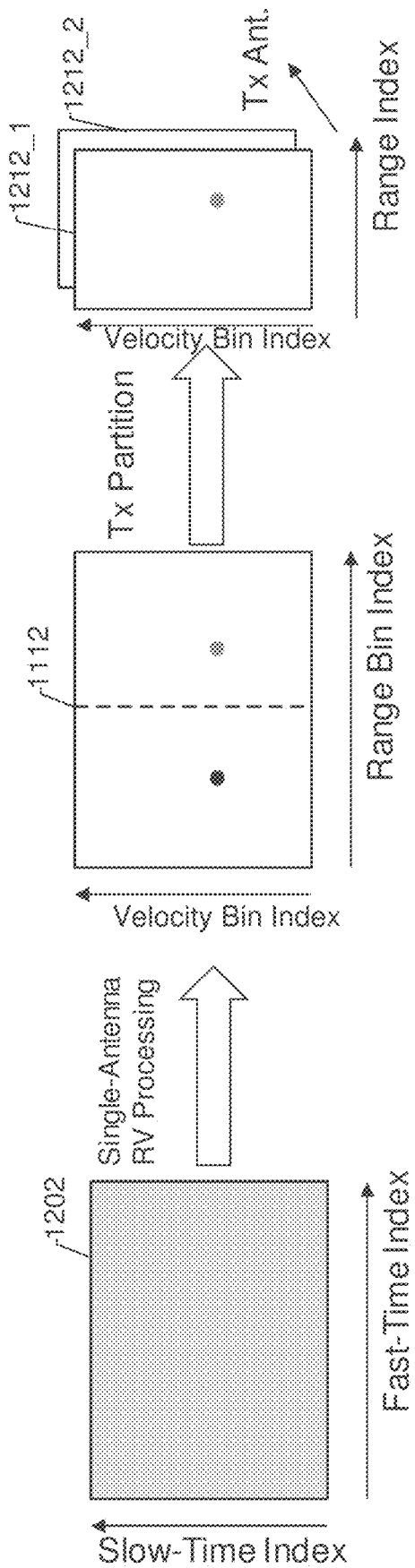
FIG. 12 includes multiple 2D matrixes that are used to describe RV processing, for use with a MIMO FMCW radar system, according to certain embodiments of the present technology in which Frequency Division Modulation (CDM) in fast-time was used to modulate the transmission signals.

FIG. 12 includes multiple 2D matrixes that are used to describe RV processing, for use with a MIMO FMCW radar system, according to certain embodiments of the present technology in which Frequency Division Modulation (FDM) in fast-time was used to modulate the transmission signals. In FIG. 12, the arrow labeled "Single-Antenna" RV processing, shown between the 2D matrix 1202 on the left and the 2D matrix 1212 in the middle, is the same as what is done in the RV processing embodiment described above with reference to FIG. 4. This results in the RV image shown 1212 in the middle of FIG. 12, which includes two point targets. Partitioning is then performed to separate the RV image into two RV images 1212_1 and 1212_2, such that there is a separate RV image for each TX antenna.

Figure 13:
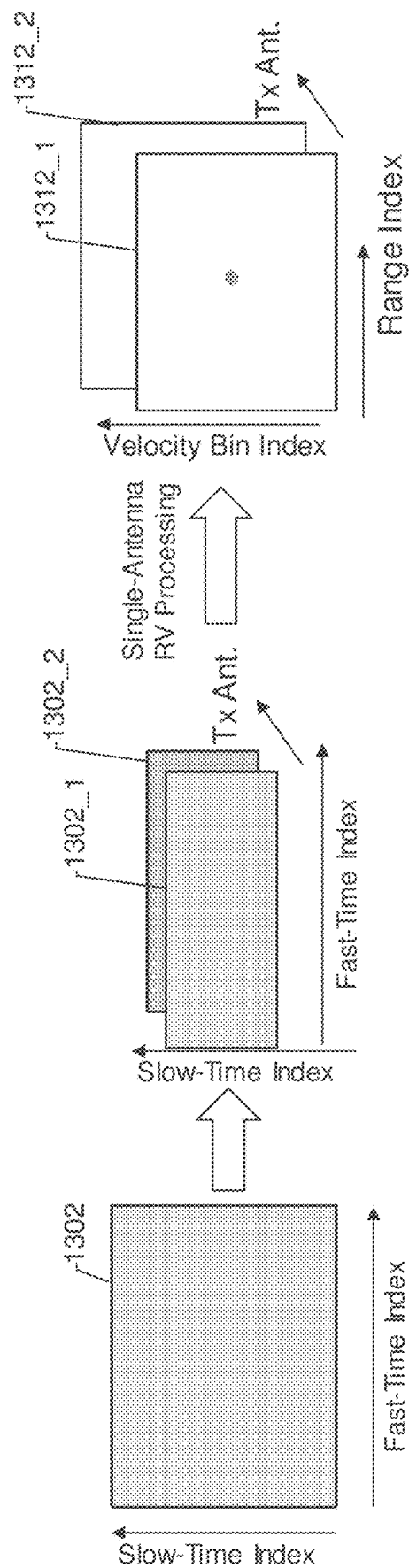
FIG. 13 includes multiple 2D matrixes that are used to describe RV processing, for use with a MIMO FMCW radar system, according to certain embodiments of the present technology in which Time Division Modulation (CDM) in slow-time was used to modulate the transmission signals.

FIG. 13 includes multiple 2D matrixes that are used to describe RV processing, for use with a MIMO FMCW radar system, according to certain embodiments of the present technology in which Time Division Modulation (TDM) in slow-time was used to modulate the transmission signals, each of which corresponds to a separate transmit antenna (TX). When using TDM in slow-time, the specific transmit antenna 118 that is being used to transmit FMCW chirps towards a target changes over time. Accordingly, the 2D matrix 1302 having the slow-time index and the fast-time index, shown at the left in FIG. 13, is separated into multiple such 2D matrixes, thereby resulting in a separate 2D matrixes (e.g., 1302_1 and 1302_2) having the slow-time index and the fast-time index for each of the separate transmit antennas. In FIG. 13, the arrow labeled "Single-Antenna" RV processing, shown between the 2D matrixes in the middle and the 2D matrixes at the right, is the same as what is done in the RV processing embodiment described above with reference to FIG. 4. This results in multiple RV images (e.g., 1312_1 and 1312_2), each of which includes a point target, as shown at the right in FIG. 13.

A radar system according to certain embodiments of the present technology includes means for generating a FMCW. Such a means can be, e.g., a waveform generator 112, which can include a DAC, and one or more processor that provides a digital signal to the DAC. The radar system also includes means for splitting the FMCW signal into a transmission signal and a local signal. Such a means can be a splitter, e.g., 114. The radar system also includes means for generating a plurality of FMCW chirps based on the transmission signal and transmitting the plurality of FMCW chirps towards a target from which the plurality of FMCW chirps are reflected. Such a means can include a transmit antenna, e.g., 118. The radar system also includes means for receiving the reflected plurality of FMCW chirps to thereby produce a reception signal. Such a means can include a receive antenna 120. The radar system also includes means for mixing the local signal with the reception signal, to thereby generate a beat signal, and means for sampling the beat signal. Such a means can include a mixer, e.g., 122. Further, the radar system includes means for generating, based on samples of the beat signal corresponding to a CPI, a first 2D matrix having a slow-time index and a fast-time index. Such a means can include one or more processor. The radar system also includes means (e.g., one or more processor) for performing a slow-time FFT on the first 2D matrix to thereby convert the slow-time index of the first 2D matrix to a Doppler bin index, and thereby produce a second 2D matrix having the Doppler bin index and the fast-time index. The radar system further includes means (e.g., one or more processor) for performing a 1D interpolation to thereby convert the Doppler bin index to a Velocity bin index and thereby produce a third 2D matrix having a Velocity bin index and a fast-time index, after the slow-time FFT is performed. Additionally, the radar system includes means (e.g., one or more processor) for performing a fast-time FFT on the third 2D matrix to thereby convert the fast-time index to a Range bin index to thereby produce a fourth 2D matrix having the Velocity bin index and a Range bin index, after the 1D interpolation is performed. The radar system also includes means (e.g., one or more processor) for determining a distance to and a velocity of the target relative to the radar system based on the fourth 2D matrix having the Velocity bin index and the Range bin index. Such processor(s) can include a DSP.

Embodiments of the present technology, described above with reference to FIGS. 1-13, were related to techniques for avoiding range ambiguity and velocity ambiguity when using FMCW radar systems, examples of which were described with reference to FIGS. 1 and 7. Further embodiments of the present technology, described below, related to techniques for avoiding range ambiguity and velocity ambiguity when using OFDM radar systems, examples of which are described below with reference to FIGS. 15 and 17. However, before going into details of the OFDM embodiments, the high level flow diagram of FIG. 14 will be used to more generally summarize methods according to certain embodiments of the present technology, which methods can be used with either FMCW radar systems or OFDM radar system, but are not limited thereto.

Figure 14:
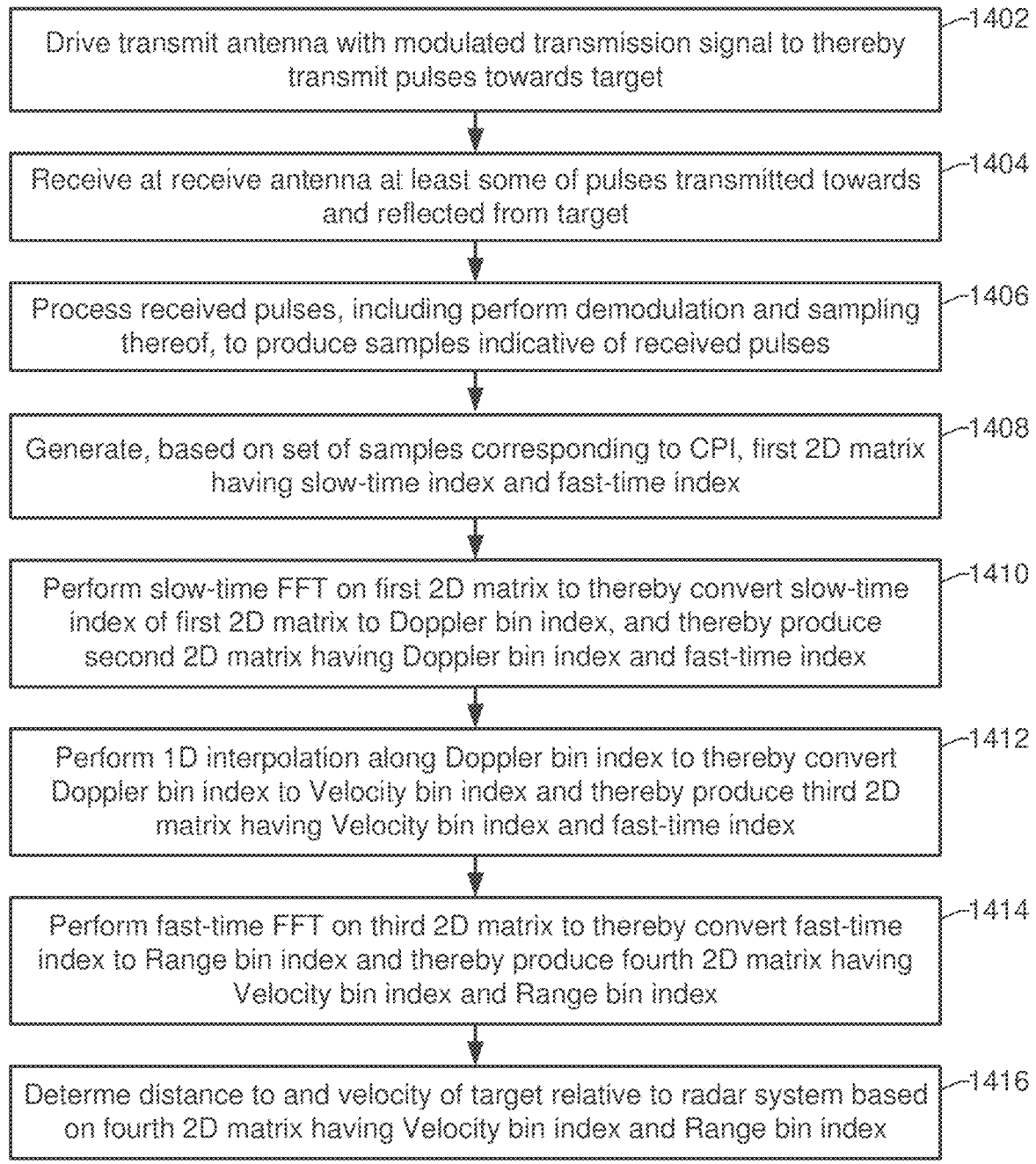
FIG. 14 is a high level flow diagram that is used to summarize methods according to certain embodiment of the present technology.

The methods summarized with reference to FIG. 14 are for use with a radar system and enable the radar system to detect a distance to and a velocity of a target relative to the radar system, while avoiding range ambiguity and velocity ambiguity. As noted above, such methods can be used with either FMCW radar systems or OFDM radar system, but are not limited thereto. Referring to FIG. 14, step 1402 involves driving a transmit antenna with a modulated transmission signal, to thereby transmit a plurality of pulses towards a target. Step 1404 involves receiving, at a receive antenna, at least some of the plurality of pulses that are transmitted towards and reflected from the target. Step 1406 involves processing the received pulses, including performing demodulation and sampling thereof, to produce a plurality of samples indicative of the received plurality of pulses. Step 1408 involves generating, based on a set of the samples corresponding to a CPI, a first 2D matrix having a slow-time index and a fast-time index. Step 1410 involves performing a slow-time FFT on the first 2D matrix to thereby convert the slow-time index of the first 2D matrix to a Doppler bin index and thereby produce a second 2D matrix having the Doppler bin index and the fast-time index. Step 1412 involves, after performing the slow-time FFT, performing a 1D interpolation along the Doppler bin index to thereby convert the Doppler bin index to a Velocity bin index and thereby produce a third 2D matrix having a Velocity bin index and a fast-time index. Step 1414 involves, after performing the 1D interpolation, performing a fast-time FFT on the third 2D matrix to thereby convert the fast-time index to a Range bin index and thereby produce a fourth 2D matrix having the Velocity bin index and a Range bin index. Step 1416 involves determining the distance to and the velocity of the target relative to the radar system based on the fourth 2D matrix having the Velocity bin index and the Range bin index.

Referring briefly back to FIG. 6, when used with an FMCW radar system, step 1402 in FIG. 14 can be performed by performing steps 602, 604, and 606 described above with reference to FIG. 6; step 1404 in FIG. 14 can be performed by performing step 608 described above with reference to FIG. 6; step 1406 in FIG. 14 can be performed by performing steps 610 and 612 described above with reference to FIG. 6; and step 1408 in FIG. 14 can be performed by performing step 1614 described above with reference to FIG. 6. Steps 1410, 1412, 1414, and 1416 in FIG. 14 are the same, respectively, as steps 616, 618, 620, and 622, described above with reference to FIG. 6. In the FMCW radar embodiments summarized above with reference to FIG. 6, the slow-time index is a chirp index, and the fast-time index is a sample index. In the OFDM radar embodiments, described below, the slow-time index is instead a symbol index, and the fast-time index is instead a subcarrier index.

Figure 15:
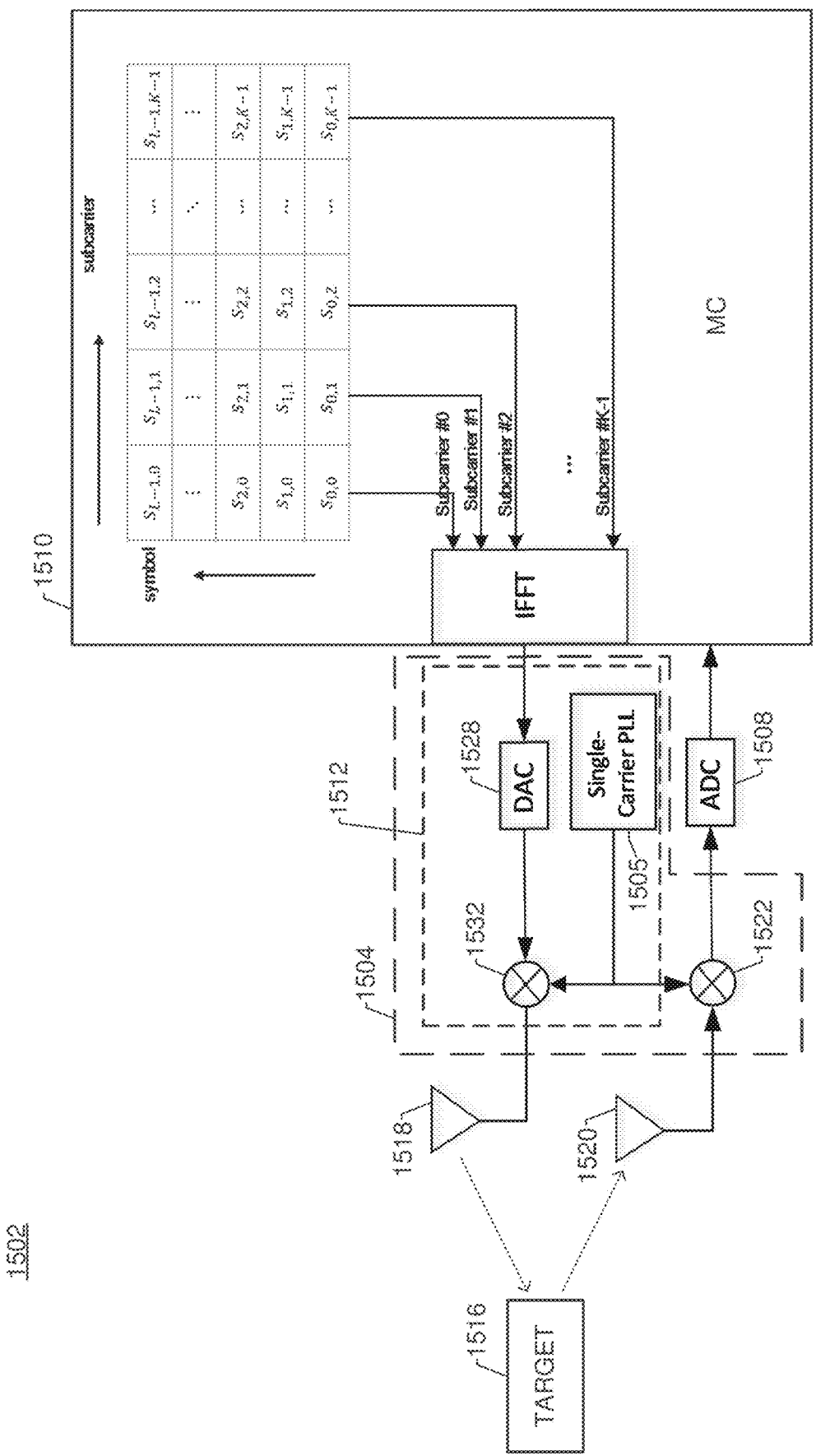
FIG. 15 illustrates an exemplary OFDM radar system with which certain embodiments of the present technology can be implemented.

FIG. 15 illustrates an exemplary OFDM radar system 1502 with which certain embodiments of the present technology can be implemented. The OFDM radar system 1502, which can also be referred to more succinctly as the radar system 1502 (or even more succinctly as the system 1502), is shown as including a transceiver 1504, a waveform generator 1512, an analog-to-digital converter (ADC) 1508, a microcomputer 1510, a transmit antenna 1518, and a receive antenna 1520. The transceiver 1504 is shown as including a single carrier phase locked loop (PLL) 1505, a digital-to-analog converter (DAC) 1528, a mixer 1532, and a mixer 1522. The PLL 1505, the DAC 1528, and the mixer 1532 make up a waveform generator 1512 of the transceiver 1504. The PLL 1505 and the mixer 1532 are used to frequency up-convert an OFDM signal provided to the mixer 1532 by the DAC 1528. The DAC 1528 produces the OFDM signal based on digital signals provided to the DAC 1528 by the microcomputer 1510, which generates symbols and subcarriers, and performs Inverse Fast Fourier Transform (FFT) processes, to generate the OFDM signal provided to the DAC 1528, as is known in the art. The PLL 1505 and the mixer 1522 are used to frequency down-convert a reception signal, produced by the receive antenna 1520, before the signal is provided to the ADC 1508 for sampling. Although not specifically shown in FIG. 15, an amplifier can be located between the mixer 1522 and the ADC 1508, or between the receive antenna 1520 and the mixer 1522. Similarly, an amplifier can be located between the DAC 1528 and the mixer 1532, or between the mixer 1532 and the transmit antenna 1518.

Each pulse of the OFDM signal can be referred to as an OFDM pulse, or as an "OFDM chip". A common set of N subcarrier (sc) frequency carriers is used to construct each of the OFDM chips. With OFDM, two consecutive subcarriers are separated by $\Delta f=1/T_s$ where $T_s$ is the duration of one OFDM symbol. This is the property of orthogonality that characterizes the spectrum of an OFDM signal. These Nsc subcarriers capture the total available bandwidth BW according to Bw=Nsc·Δf.

The transmit antenna 1518 is driven with a transmission signal fs, to thereby transmit a plurality of OFDM chips towards a target object 1516 from which at least some of the plurality of OFDM chips are reflected. The receive antenna 1520 receives a reflected radar wave which comes from the target object 1516 reflecting the radar wave transmitted by the antenna 1518, and outputs a reception signal fr according to the received reflected radar wave. In other words, the receive antenna 1520 receives the reflected OFDM chips to thereby produce the reception signal fr. The target object 1516 can also be referred to herein more succinctly as the target 1516, or alternatively as the object or the obstacle.

The mixer 1522 mixes the singe carrier PLL signal and the reception signal fr from the antenna 1520 to generate a signal that is sampled by the ADC 1508. As noted above, an amplifier (not shown) can amplify the signal generated by the mixer 1522 prior to the sampling. It would also be possible to swap the order of the mixer 122 and such an amplifier, which would result in the reception signal fr being amplified before being mixed with the single carrier PLL signal.

The ADC 1508 is used to sample the analog signal provided thereto to convert the analog signal into a digital signal, and the digital signal is provided to the microcomputer 1510, which uses the inputted digital signal for calculating the distance and/or the relative velocity of the target. Explained another way, the ADC 108 samples the reception signal during a CPI, and the microcomputer 110 processes the samples of the reception signal to determine the distance to and the velocity of the target 1516 relative to the radar system 1502. While not specifically shown in FIG. 15, one or more filters can be in the receive path between the receive antenna 1520 and the ADC 1508.

The microcomputer 1510 can include, e.g., a CPU, ROM, and RAM and can calculate based on the digital data from the ADC 1508 the distance to the target object and/or the relative velocity of the target object. The microcomputer 110 can be or include a DSP for executing channel estimation and FFT processes in a frequency analysis process. More generally, the microcomputer 1510 can include one or more processors that can perform the necessary processing to determine the distance to and velocity of the target 1516 relative to the radar system 1502. The calculated distance and the calculated relative velocity can be, e.g., provided to a cruise velocity travel controller having a function for controlling the distance to the preceding vehicle and used in, for example, executing the function for controlling the distance. More generally, the calculated distance and velocity can be used for self-driving, parking assistance, lane departure warning, automatic distance control, cut-in collision warning, rear-end collision warning, front-end collision warning, and/or blind spot detection. These are just a few examples of the possible uses of the calculated distance and velocity, which examples are not intended to be all encompassing.

As was the case with FMCW radar systems, examples of which were described above, Range ambiguity and Doppler ambiguity problems can also occur with OFDM radar systems that utilize standard Range-Doppler (RD) processing. In a similar manner to those discussed above (e.g., initially with reference to FIG. 4) with respect to FMCW radar systems, Range ambiguity and Doppler ambiguity problems can also be overcome in OFDM radar systems by performing a 1D interpolation after performing a slow-time FFT, and then performing a fast-time FFT following the 1D interpolation. Such embodiments will initially be described below with reference to FIG. 16.

In OFDM radar, the reception signal, referred to above as fr (which can also be expressed as x_l,k) using the following equation:

$$x_{l,k} \approx \beta s_{l,k} e^{j4\pi \frac{k\Delta f r_0}{c}} e^{j2\pi f_d lT} + \text{noise}$$

where,
x is the reception signal,
l is the symbol index,
k is the subcarrier index,
β is the amplitude of the reception signal,
s is the transmission signal,
$r_0$ is the initial distance of the target from the radar system at the beginning of the symbol interval,
fd is the Doppler frequency,
Δf is the frequency separation between consecutive orthogonal subcarrier frequencies,
T is the symbol duration,
c is the speed of light, and
"noise" represents clutter and/or other noise.

Standard RD processing can be performed using the following equation:

$$\beta(r, f_d) = \sum\nolimits_{f,n} [x_{l,k} s_{l,k}^*] e^{-j4\pi \frac{k\Delta f r_0}{c}} e^{-j2\pi f_d lT}.$$

Range and Doppler processing can be decoupled, and hence simple 2D FFTs can be used to perform standard RD processing. However, for fast-moving and wideband cases, delay variations over symbols can result in a range-walking problem.

In accordance with certain embodiments, a more accurate data model can be used for the reception signal (which can also be expressed as x_l,k) using the following equation:

$$x_{l,k} \approx \beta s_{l,k} e^{j4\pi \frac{k\Delta f (r_0 + v lT)}{c}} e^{j4\pi \frac{v}{c} f_c lT} + \text{noise}.$$

OFDM Range Velocity (RV) processing can then be performed using the following equation:

$$\beta(r, f_d) = \sum\nolimits_{l,k} x_{l,k} s_{l,k}^* e^{-j4\pi \frac{k\Delta f (r_0 + v lT)}{c}} e^{-\frac{j4\pi v}{c lT}} =$$

$$\sum\nolimits_{k} e^{-j4\pi \frac{k\Delta f}{c}} \sum\nolimits_{l} [x_{l,k} s_{l,k}^*] e^{-j4\pi \frac{v(f_c + k\Delta f)}{c} lT} = \sum\nolimits_{k} e^{-j4\pi \frac{k\Delta f}{c}} [\tilde{Z}(v, k)]$$

where, $$\tilde{Z}(v, k) = X\left(\frac{2v(f_c + k\Delta f)}{c}\right),$$

and $X(\omega, k) = \Sigma_k \, x_{l,k} s_{l,k}^* \, e^{-j2\pi \omega lT}$.

Figure 16:
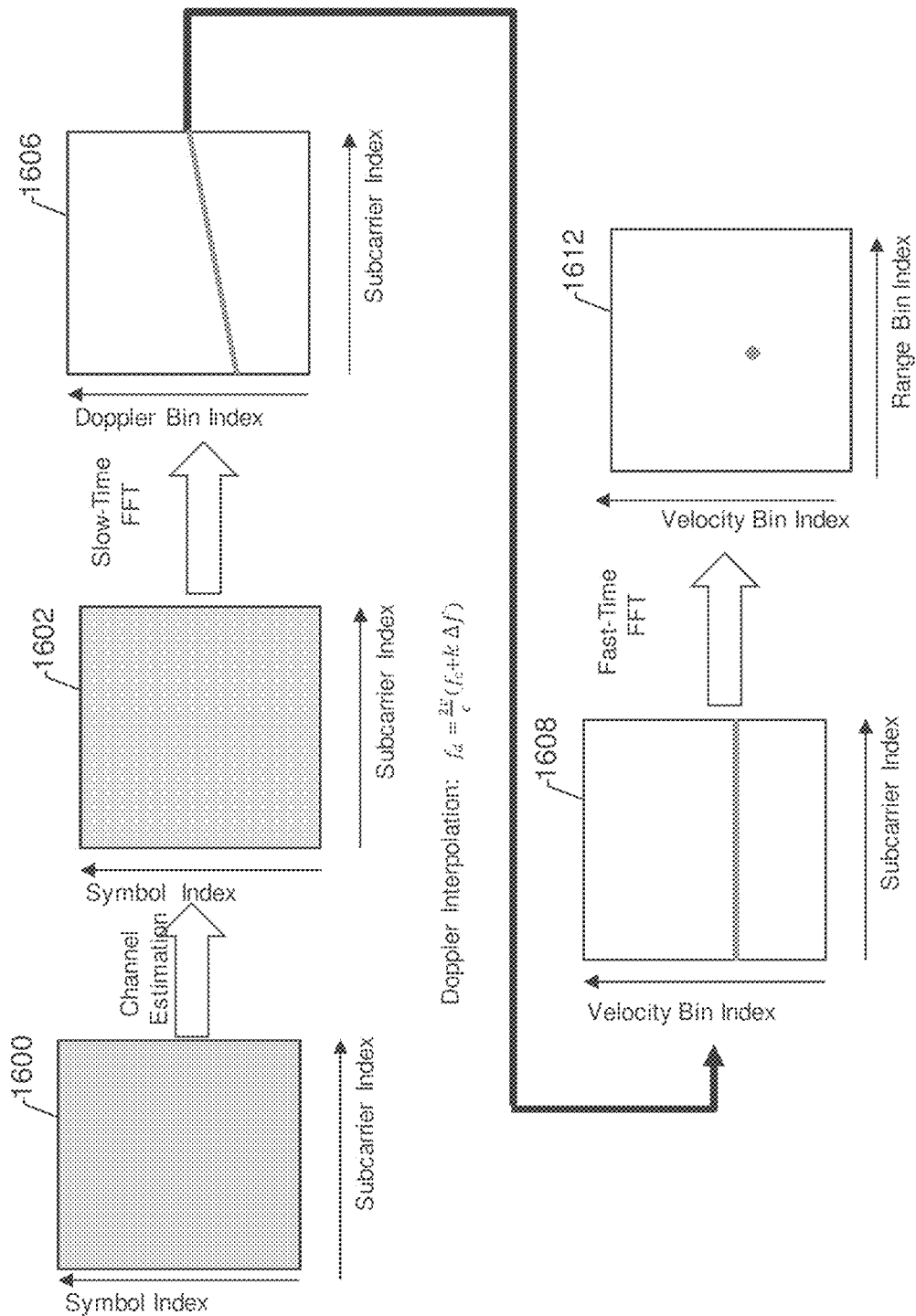
FIG. 16 includes 2D matrixes that are used to describe RV processing for use with an OFDM radar system according to certain embodiments of the present technology.

Referring now to FIG. 16, shown therein are 2D matrixes that are used to describe RV processing for use with an OFDM radar system (e.g., 1502) according to certain embodiments of the present technology. The 2D matrix 1600 at the upper left represents the output of the mixer 1522 of the receiver portion of the transceiver 1504 in FIG. 15 after it has been sampled by the ADC 1508 and a CPI worth of time-domain data has been organized into the 2D matrix. This 2D matrix 1600 can also be referred to as raw OFDM data, since it has not yet been demodulated using channel estimation performed by the microcomputer 1510. The 2D matrix 1602, shown to the right of the 2D matrix 1600, can be produced by performing channel estimation to demodulate/remove training information from the raw OFDM data represented by the 2D matrix 1600. For an example, assume the raw OFDM data, represented by the 2D matrix 1600, is denoted by [x(l, k)]. Let [s(l, k)] be a transmitted matrix. In such an embodiment, the 2D matrix 1602 can be [x{l, k}*conj(s{l, k})], with conj( )denoting the complex conjugate operator. Each element or entry of the 2D matrix 1602 represents a wireless channel at a given subcarrier index and symbol index, wherein the process used to covert that 2D matrix 1600 to the 2D matrix 1602 can be referred to as "channel estimation".

As was explained above with reference to FIG. 15, the output of the mixer 1522 can be amplified by an amplifier (not shown) before being converted to a digital signal by the ADC 1508. Additionally, as was mentioned above, filtering can also be performed prior to the sampling by the ADC 1508.

The 2D matrix 1602 in FIG. 16, is partially converted to frequency domain data by performing a Fast Fourier Transform (FFT) for each column, which results in the 2D matrix 1606 in the upper right in FIG. 16. Where an FFT is performed to convert all the samples within a same fast-time index to the frequency domain, the FFT can be referred to as a Slow-Time FFT (since the FFT is combining slow time samples). That is why the arrow between the 2D matrix 1602 in FIG. 16 and the 2D matrix 1606 at the upper right of FIG. 16 is labeled "Slow-Time FFT". Performing the Slow-Time FFT converts the slow-time index, which in this case was the symbol-index, to a Doppler bin index, with each bin corresponding to a different Doppler frequency shift.

After the Slow-Time FFT is performed, resulting in the 2D matrix 1606 at the upper right in FIG. 16, the 2D matrix 1606 in the upper right in FIG. 16 is converted to the 2D matrix at the lower left in FIG. 16 by performing a Doppler interpolation that removes Range ambiguity and Doppler ambiguity. More specifically, a 1D interpolation is performed along the Doppler bin index to thereby convert the Doppler bin index to a Velocity bin index (with each bin corresponding to a different velocity of the target relative to the radar system), and thereby produce a 2D matrix having a Velocity bin index and a fast-time index, which in this case is the subcarrier index, as represented in the lower left in FIG. 16. Exemplary types of interpolation that can be performed included, but are not limited to, nearest neighbor interpolation, linear interpolation, or spline interpolation.

In accordance with certain embodiments of the present technology, the 1D interpolation is performed using the following equation:

$$f_d = \frac{-2v}{c}(f_c + k\Delta f),$$

where
$f_d$ is the Doppler frequency,
v is the velocity of the target relative to the radar system,
$f_c$ is a single carrier frequency,
k is the subcarrier index, and
$\Delta f$ is the frequency separation between consecutive orthogonal subcarrier frequencies.

The use of other equations for performing the 2D interpolation are also possible and within the scope of the embodiments described herein.

In FIG. 16, the 2D matrix 1610 at the bottom right can be referred to as a 2D matrix having a Range bin index and a Velocity bin index, or as a Range Velocity (RV) image. Each bin of the Velocity bin index corresponds to a different velocity of the target relative to radar system. Each bin along a Doppler bin index corresponds to a different Doppler frequency shift, where the Doppler frequency shift differs for different subcarrier frequencies of an OFDM signal. Accordingly, there is not an actual one to one correspondence between Doppler frequency shift and velocity, and thus, with the RD images each Doppler bin is not actually indicative of a different velocity of the target relative to the radar system.

Figure 17:
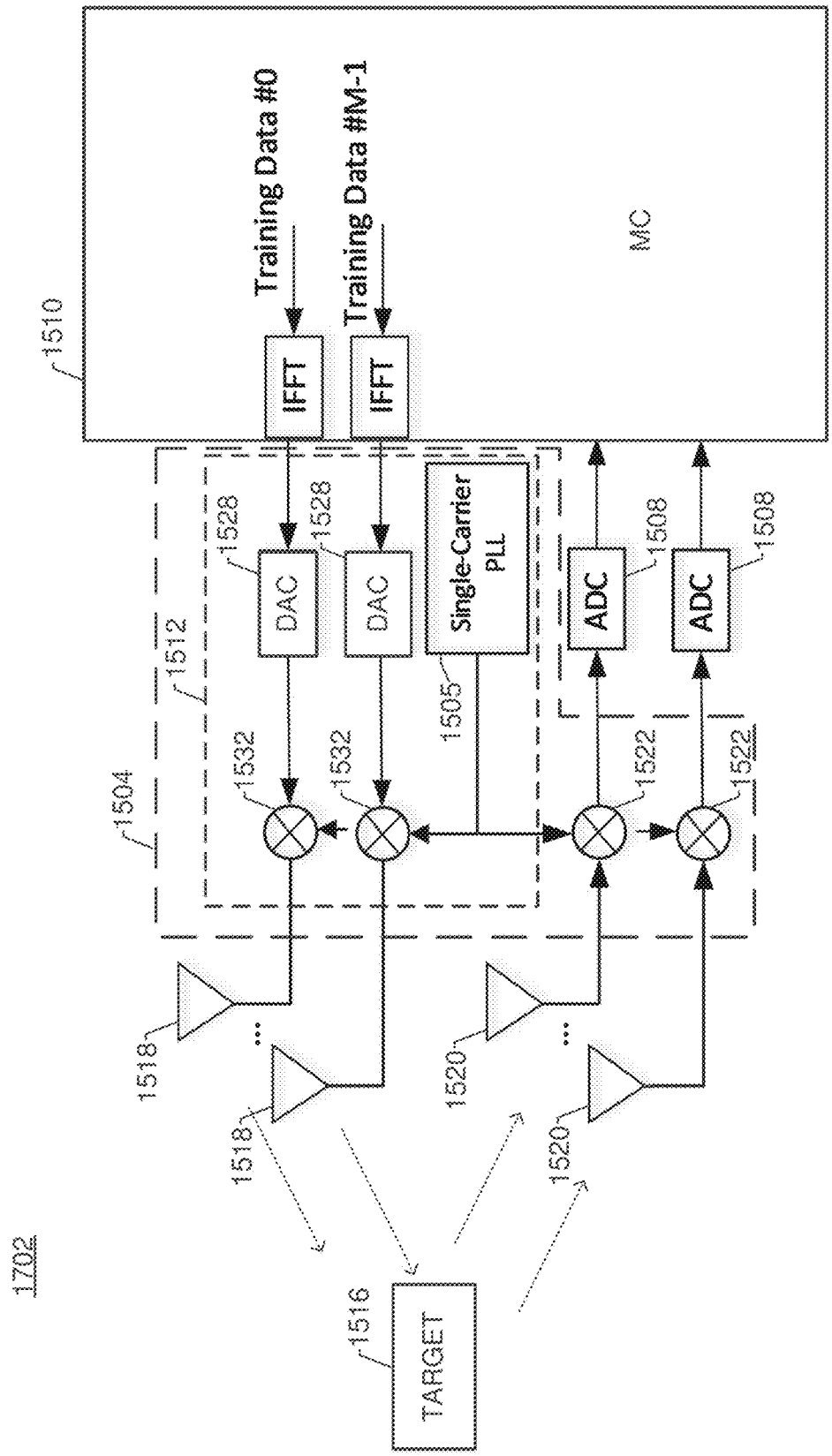
FIG. 17 illustrates an exemplary MIMO OFDM radar system with which certain embodiments of the present technology can be implemented.

The OFDM radar system 1502 described above with reference to FIG. 15 was shown as including a single transmit antenna 1518 and a single receive antenna 1520. Embodiments of the present technology can also be used with MIMO OFDM radar systems including a plurality of (i.e., multiple) transmit antennas 1518 and a plurality of (i.e., multiple) receive antennas 1520. An example of such a MIMO OFDM radar system 1702 is shown in FIG. 17. The transceiver 1504 of the MIMO OFDM radar system 1702 is shown as including a waveform generator 1512, a plurality of DACs 1528, and a plurality of mixers 1532. The MC 1510 can provide digital signals to the DACs 1528, which convert the digital signals to analog signals before such signals are mixed by the mixers 1532 with the RF signal (and more specifically, the OFDM signal) produced by the waveform generator 1512, to thereby produce a plurality of transmission signals fs, each of which drives one of the transmit antennas 1518. The digital signals produced by the MC 1510, which are provided to the DACs 1528, can be used to implement any one of a plurality of different types of MIMO modulation schemes, included, but not limited to, DDM in slow-time, CDM in slow-time, FDM in fast-time, or TDM in slow-time. The number of receive antennas 1520 in the MIMO radar system 1702 can be the same or different than the number of transmit antennas 1518.

When using MIMO OFDM radar that includes m transmit antennas, and n receive antennas, for each of the n receive antennas a separate Range Velocity (RV) image (i.e., a 2D matrix having a Velocity bin index and the Range bin index) will be produced for each of the m transmit antennas. This leads to a total of m*n RV images being produced. For example, if there are two transmit antennas 1518, and four receive antennas 1520, then for each of the four receive antennas 1520 two RV image will be produced, resulting in a total of eight RV images being produced. From the multiple RV images, the distance to and velocity of a target relative to the MIMO radar system can be determined. Additionally, an angle of the target (e.g., azimuth angle and/or an elevation angle) relative to the MIMO radar system can be determined from the multiple RV images. Any one of a variety of different known techniques can be used to determine angles from the multiple RD image, such as but not limited to, digital beamforming, angle FFT, and MUSIC (multiple signal classification) algorithms.

Figure 18:
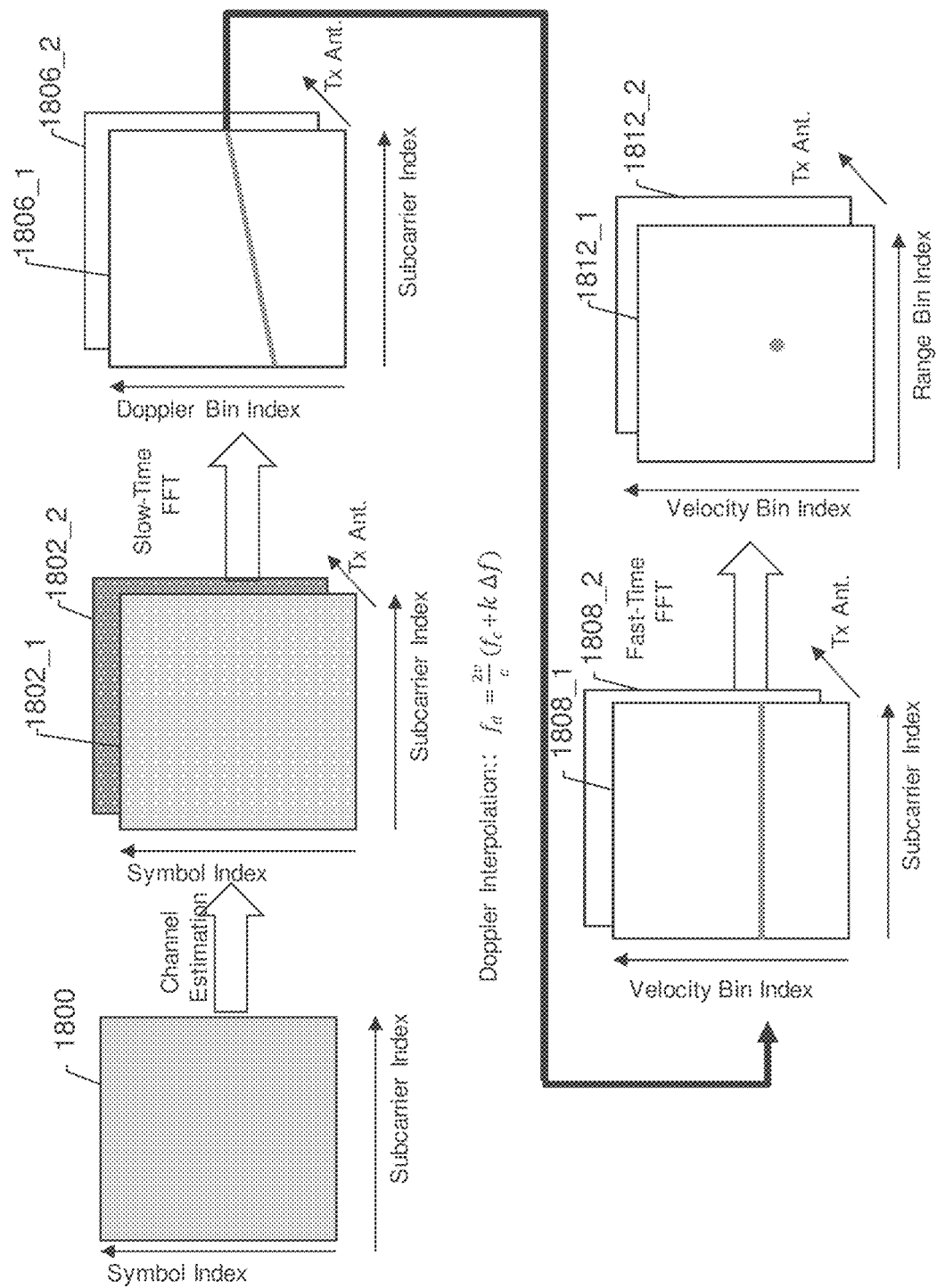
FIG. 18 includes multiple 2D matrixes that are used to describe RV processing, for use with a MIMO OFDM radar system, according to certain embodiments of the present technology.

FIG. 18 includes multiple 2D matrixes that are used to describe range velocity (RV) processing, for use with a MIMO OFDM radar system, according to certain embodiments of the present technology. The 2D matrix 1800 at the upper left represents raw OFDM data. The 2D matrixes 1802_1 and 1802_2, shown to the right of the 2D matrix 1800, represented demodulated data generated respectively from the reception signals associated with each of two receive antennas 1522, which matrixes can be produced by performing channel estimation to demodulate/remove training information from the raw OFDM data represented by the 2D matrix 1800.

Each of the 2D matrixes 1802_1 and 1802_2 in FIG. 18, is partially converted to frequency domain data by performing a FFT for each column, which results in respective 2D matrixes 1806_1 and 1806_2 in the upper right in FIG. 18. Where an FFT is performed to convert all the samples within a same fast-time index to the frequency domain, the FFT can be referred to as a Slow-Time FFT (since the FFT is combining slow time samples). That is why the arrow between the 2D matrixes 1802_1 and 1802_2 in FIG. 18 and the 2D matrixes 1806_1 and 1806_2 at the upper right of FIG. 18 is labeled "Slow-Time FFT". Performing the Slow-Time FFT converts the slow-time index, which in this case was the symbol-index, to a Doppler bin index, with each bin corresponding to a different Doppler frequency shift.

After the Slow-Time FFT is performed, resulting in the 2D matrixes 1806_1 and 180_2 at the upper right in FIG. 18, the 2D matrixes 1806_1 and 1806_2 in the upper right in FIG. 18 are converted to the 2D matrixes 1808_1 and 1808_2 at the lower left in FIG. 18 by performing a Doppler interpolation that removes Range ambiguity and Doppler ambiguity. More specifically, a 1D interpolation is performed along the Doppler bin index to thereby convert the Doppler bin index to a Velocity bin index (with each bin corresponding to a different velocity of the target relative to the radar system), and thereby produce the 2D matrixes 1812_1 and 1812_2 having a Velocity bin index and a fast-time index, which in this case is the subcarrier index, as represented in the lower left in FIG. 16. Exemplary types of interpolation that can be performed included, but are not limited to, nearest neighbor interpolation, linear interpolation, or spline interpolation. An exemplary equation that can be used to perform the 1D interpolation was discussed above.

A radar system according to certain embodiments of the present technology includes means for generating a modulated signal. Such a means can be, e.g., a waveform generator, which can include a DAC, and one or more processor that provides a digital signal to the DAC. The radar system also includes means for generating a plurality of pulses based on the modulated signal and transmitting the plurality of pulses towards a target. Such a means can include a transmit antenna. The radar system can also include means for receiving at least some of the plurality of pulses that are transmitted towards and reflected from the target. Such a means can include a receive antenna. The radar system can further include means for producing a plurality of samples indicative of the received pulses. Such a means can include an ADC. The radar system can further include means (e.g., one or more processor) for generating, based on a set of the samples corresponding to a CPI, a first 2D matrix having a slow-time index and a fast-time index. The radar system further includes means (e.g., one or more processor) for performing a slow-time FFT on the first 2D matrix to thereby convert the slow-time index of the first 2D matrix to a Doppler bin index and thereby produce a second 2D matrix having the Doppler bin index and the fast-time index. The radar system also includes means (e.g., one or more processor) for performing a 1D interpolation along the Doppler bin index to thereby convert the Doppler bin index to a Velocity bin index and thereby produce a third 2D matrix having a Velocity bin index and a fast-time index, after the slow-time FFT is performed. The radar system also includes means (e.g., one or more processor) for performing a fast-time FFT on the third 2D matrix to thereby convert the fast-time index to a Range bin index and thereby produce a fourth 2D matrix having the Velocity bin index and a Range bin index, after the 1D interpolation is performed. The radar system further includes means (e.g., one or more processor) for determining a distance to and a velocity of the target relative to the radar system based on the fourth 2D matrix having the Velocity bin index and the Range bin index.

Certain embodiments of the present technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does not include propagated, modulated, or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein.

Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, by a radar system, of detecting a distance to and a velocity of a target relative to the radar system, the method comprising:
   driving a transmit antenna with a modulated transmission signal to transmit a plurality of pulses;
   receiving, at a receive antenna, reflected pulses from a target and at least some of the plurality of transmitted pulses;
   processing the reflected pulses, by sampling and demodulating the reflected pulses, to produce a plurality of samples of the reflected pulses;
   generating, based on a set of the plurality of samples, corresponding to a coherent processing interval (CPI), a first two-dimensional (2D) matrix having a slow-time index and a fast-time index;
   performing a slow-time FFT on the first 2D matrix to thereby convert the slow-time index of the first 2D matrix to a Doppler bin index and thereby produce a second 2D matrix having the Doppler bin index and the fast-time index;
   after performing the slow-time FFT, performing a one-dimensional (1D) interpolation along the Doppler bin index to thereby convert the Doppler bin index to a Velocity bin index and thereby produce a third 2D matrix having a Velocity bin index and a fast-time index;
   after performing the 1D interpolation, performing a fast-time FFT on the third 2D matrix to thereby convert the fast-time index to a Range bin index and thereby produce a fourth 2D matrix having the Velocity bin index and a Range bin index; and
   determining the distance to and the velocity of the target relative to the radar system based on the fourth 2D matrix having the Velocity bin index and the Range bin index.

2. The method of claim 1, wherein:
   the modulated transmission signal comprises a frequency modulated continuous waveform (FMCW) signal;

each said slow-time index comprises a chirp index; and
each said fast-time index comprises a sample index.

3. The method of claim 2, wherein the 1D interpolation is performed using the $$f_d = \frac{2v}{c}(f_0 + \gamma t),$$

following equation:
where
  $f_d$ is a Doppler frequency,
  v is a velocity of the target relative to the radar system,
  $f_0$ is a starting frequency of the FMCW signal,
  $\gamma$ is a chirp slope rate,
  c is the speed of light, and
  t is the fast time.

4. The method of claim 1, wherein:
  the modulated transmission signal comprises an orthogonal frequency-division multiplexing (OFDM) signal;
  each said slow-time index comprises a symbol index; and
  each said fast-time index comprises a subcarrier index.

5. The method of claim 4, wherein the 1D interpolation is performed using the $$f_d = \frac{2v}{c}(f_c + k\Delta f),$$

following equation:
where
  $f_d$ is a Doppler frequency,
  v is a velocity of the target relative to the radar system,
  $f_c$ is a single carrier frequency,
  k is a subcarrier index,
  $\Delta f$ is a frequency separation between consecutive orthogonal subcarrier frequencies.

6. The method of claim 1, wherein:
  the performing the slow-time FFT on the first 2D matrix having the slow-time index and the fast-time index, to thereby convert the slow-time index to the Doppler bin index, comprises performing a separate FFT for each bin of the fast-time index along the slow-time index; and
  the performing the fast-time FFT on the third 2D matrix having the Velocity bin index and the fast-time index, to thereby convert the fast-time index to the Range bin index, comprises performing a separate FFT for each bin of the Velocity bin index along the fast-time index.

7. The method of claim 6, wherein the 1D interpolation comprises one of nearest neighbor interpolation, linear interpolation, or spline interpolation.

8. The method of claim 1, wherein the radar system comprises a multiple-input and multiple-output (MIMO) radar system including a plurality of transmit antennas and a plurality of receive antennas, and wherein:
  each of the plurality of transmit antennas is driven by a respective said modulated transmission signal;
  each of the plurality of receive antenna receives at least some of the plurality of pulses that are transmitted towards and reflected from the target and thereby produces a respective reception signal;
  a respective first 2D matrix having a slow-time index and a fast-time index is generated based on samples of each of the reception signals corresponding to a CPI;
  a slow-time FFT is performed on each of the first 2D matrixes to thereby convert the respective slow-time index of each of the first 2D matrixes to a respective Doppler bin index, and thereby produce a respective second 2D matrix having the Doppler bin index and the fast-time index;
  after performing the slow-time FFTs, for each of the second 2D matrixes having the Doppler bin index and the fast-time index, a respective 1D interpolation is performed to thereby convert the Doppler bin index to a Velocity bin index, and thereby produce a respective third 2D matrix having a Velocity bin index and a fast-time index;
  after performing the 1D interpolations, for each of the third 2D matrixes having a Velocity bin index and a fast-time index, a respective fast-time FFT is performed on the third 2D matrix to thereby convert the fast-time index to a Range bin index, to thereby produce a respective fourth 2D matrix having the Velocity bin index and a Range bin index; and
  the determining the distance to and the velocity of the target relative to the radar system is based on the plurality of fourth 2D matrixes having the Velocity bin index and the Range bin index.

9. The method of claim 8, wherein one of the following MIMO modulation schemes is used for MIMO modulation:
  Doppler Division Modulation (DDM) in slow-time;
  Code Division Modulation (CDM) in slow-time;
  Frequency Divisional Modulation (FDM) in fast-time; or
  Time Divisional Modulation (TDM) in slow-time.

10. The method of claim 9, wherein the plurality of transmit antennas comprise m transmit antennas, and wherein each of the 1D interpolations is performed using the following equation:

$$f_{d,m} = \frac{2v}{c}(f_0 + \gamma t) + f_{mod,m},$$

where signal,
  $f_{d,m}$ is a Doppler frequency for an m-th transmit antenna,
  v is a velocity of the target relative to the radar system,
  $f_0$ is a starting frequency of a frequency modulated continuous waveform (FMCW) signal,
  $\gamma$ is a chirp ramp slope,
  c is the speed of light,
  t is the fast time, and
  $f_{mod,m}$ is a modulated Doppler Frequency for the m-th transmit antenna.

11. A radar system, comprising:
a waveform generator configured to generate a modulated signal;
a transmit antenna configured to be driven by the modulated signal to transmit a plurality of pulses;
a receive antenna configured to receive reflected pulses from a target and at least some of the plurality of transmitted pulses;
an analog-to-digital converter (ADC) configured to produce a plurality of samples indicative of the received pulses by sampling and demodulating the reflected pulses;
at least one processor configured to
  generate, based on a set of the plurality of samples corresponding to a coherent processing interval (CPI), a first two-dimensional (2D) matrix having a slow-time index and a fast-time index;

perform a slow-time FFT on the first 2D matrix to thereby convert the slow-time index of the first 2D matrix to a Doppler bin index and thereby produce a second 2D matrix having the Doppler bin index and the fast-time index;

after the slow-time FFT is performed, perform a one-dimensional (1D) interpolation along the Doppler bin index to thereby convert the Doppler bin index to a Velocity bin index and thereby produce a third 2D matrix having a Velocity bin index and a fast-time index;

after the 1D interpolation is performed, perform a fast-time FFT on the third 2D matrix to thereby convert the fast-time index to a Range bin index and thereby produce a fourth 2D matrix having the Velocity bin index and a Range bin index; and determine a distance to and a velocity of the target relative to the radar system based on the fourth 2D matrix having the Velocity bin index and the Range bin index.

12. The radar system of claim 11, wherein:
the modulated transmission signal comprises a frequency modulated continuous waveform (FMCW) signal;
each said slow-time index comprises a chirp index; and
each said fast-time index comprises a sample index.

13. The radar system of claim 12, wherein the at least one processor is configured to perform the 1D interpolation using the following equation:

$$f_d = \frac{2v}{c}(f_0 + \gamma t),$$

where
$f_d$ is a Doppler frequency,
v is a velocity of the target relative to the radar system,
$f_0$ is a starting frequency of the FMCW signal,
$\gamma$ is a chirp slope rate,
c is the speed of light, and
t is the fast time.

14. The radar system of claim 11, wherein:
the modulated transmission signal comprises an orthogonal frequency-division multiplexing (OFDM) signal;
each said slow-time index comprises a symbol index; and
each said fast-time index comprises a subcarrier index.

15. The radar system of claim 14, wherein the 1D interpolation is performed using $$f_d = \frac{2v}{c}(f_c + k\Delta f),$$

the following equation:
where
$f_d$ is a Doppler frequency,
v is a velocity of the target relative to the radar system,
$f_c$ is a single subcarrier frequency,
k is a subcarrier index,
$\Delta f$ is a frequency separation between consecutive orthogonal subcarrier frequencies.

16. The radar system of claim 15, wherein the at least one processor is configured to:
perform the slow-time FFT on the first 2D matrix having the slow-time index and the fast-time index, to thereby convert the slow-time index to the Doppler bin index, by performing a separate FFT for each bin of the fast-time index along the slow-time index; and
perform the fast-time FFT on the third 2D matrix having the Velocity bin index and the fast-time index, to thereby convert the fast-time index to the Range bin index, by performing a separate FFT for each bin of the Velocity bin index along the fast-time index.

17. The system of claim 11, wherein the radar system comprises a multiple-input and multiple-output (MIMO) radar system including a plurality of transmit antennas and a plurality of receive antennas, and wherein:
each of the plurality of transmit antennas is driven by a respective said modulated transmission signal;
each of the plurality of receive antennas receives at least some of the plurality of pulses that are transmitted towards and reflected from the target and thereby produces a respective reception signal;
the at least one processor is configured to:
generate a respective first 2D matrix having a slow-time index and a fast-time index based on samples of each of the reception signals corresponding to a CPI;
perform a slow-time FFT on each of the first 2D matrixes to thereby convert the respective slow-time index of each of the first 2D matrixes to a respective Doppler bin index, and thereby produce a respective second 2D matrix having the Doppler bin index and the fast-time index;
after the slow-time FFTs are performed, for each of the second 2D matrixes having the Doppler bin index and the fast-time index, perform a respective 1D interpolation to thereby convert the Doppler bin index to a Velocity bin index, and thereby produce a respective third 2D matrix having a Velocity bin index and a fast-time index;
after the 1D interpolations are performed, for each of the third 2D matrixes having a Velocity bin index and a fast-time index, perform a fast-time FFT on the third 2D matrix to thereby convert the fast-time index to a Range bin index, to thereby produce a respective fourth 2D matrix having the Velocity bin index and a Range bin index; and
determine the distance to and the velocity of the target relative to the radar system based on the plurality of fourth 2D matrixes having the Velocity bin index and the Range bin index.

18. A non-transitory computer-readable medium storing computer instructions that when executed by one or more processors of a radar system cause the one or more processors of the radar system to perform the steps of:
processing, by the one or more processors of the radar system, reflected pulses received by the radar system to produce a set of samples of the reflected pulses;
generating by the one or more processors of the radar system, based on the set of samples corresponding to a coherent processing interval (CPI), a first two-dimensional (2D) matrix having a slow-time index and a fast-time index;
performing by the one or more processors of the radar system a slow-time FFT on the first 2D matrix to thereby convert the slow-time index of the first 2D matrix to a Doppler bin index and thereby produce a second 2D matrix having the Doppler bin index and the fast-time index;
after performing the slow-time FFT, performing by the one or more processors of the radar system a one-dimensional (1D) interpolation along the Doppler bin index to thereby convert the Doppler bin index to a Velocity bin index and thereby produce a third 2D matrix having a Velocity bin index and a fast-time index;

after performing the 1D interpolation, performing by the one or more processors of the radar system a fast-time FFT on the third 2D matrix to thereby convert the fast-time index to a Range bin index and thereby produce a fourth 2D matrix having the Velocity bin index and a Range bin index; and calculating by the one or more processors of the radar system the distance to and the velocity of the target relative to the radar system based on the fourth 2D matrix having the Velocity bin index and the Range bin index.

19. The non-transitory computer-readable medium of claim 18, wherein:

the performing the slow-time FFT on the first 2D matrix having the slow-time index and the fast-time index, to thereby convert the slow-time index to the Doppler bin index, comprises performing a separate FFT for each bin of the fast-time index along the slow-time index;

the performing the 1D interpolation along the Doppler bin index to thereby convert the Doppler bin index to the Velocity bin index comprises performing a separate 1D interpolation for each bin of the fast-time index along the Doppler bin index; and the performing the fast-time FFT on the third 2D matrix having the Velocity bin index and the fast-time index, to thereby convert the fast-time index to the Range bin index, comprises performing a separate FFT for each bin of the Velocity bin index along the fast-time index.

20. The non-transitory computer-readable medium of claim 19, wherein:

the 1D interpolation comprises one of nearest neighbor interpolation, linear interpolation, or spline interpolation.

21. A radar system, comprising:

means for generating a modulated signal;

means for generating a plurality of pulses based on the modulated signal and transmitting the plurality of pulses;

means for receiving reflected pulses from a target and at least some of the plurality of transmitted pulses;

means for producing a plurality of samples indicative of the received pulses by sampling and demodulating the reflected pulses;

means for generating, based on a set of the plurality of samples corresponding to a coherent processing interval (CPI), a first two-dimensional (2D) matrix having a slow-time index and a fast-time index;

means for performing a slow-time FFT on the first 2D matrix to thereby convert the slow-time index of the first 2D matrix to a Doppler bin index and thereby produce a second 2D matrix having the Doppler bin index and the fast-time index;

means for performing a one-dimensional (1D) interpolation along the Doppler bin index to thereby convert the Doppler bin index to a Velocity bin index and thereby produce a third 2D matrix having a Velocity bin index and a fast-time index, after the slow-time FFT is performed;

means for performing a fast-time FFT on the third 2D matrix to thereby convert the fast-time index to a Range bin index and thereby produce a fourth 2D matrix having the Velocity bin index and a Range bin index, after the 1D interpolation is performed; and means for determining a distance to and a velocity of the target relative to the radar system based on the fourth 2D matrix having the Velocity bin index and the Range bin index.

22. The radar system of claim 21, wherein:

the modulated transmission signal comprises a frequency modulated continuous waveform (FMCW) signal;

each said slow-time index comprises a chirp index; and each said fast-time index comprises a sample index.

23. The radar system of claim 21, wherein:

the modulated transmission signal comprises an orthogonal frequency-division multiplexing (OFDM) signal;

each said slow-time index comprises a symbol index; and each said fast-time index comprises a subcarrier index.

* * * * *

UNITED STATES PATENT AND TRADEMARK OFFICE
CERTIFICATE OF CORRECTION

PATENT NO. : 11,994,576 B2
APPLICATION NO. : 17/198785
DATED : May 28, 2024
INVENTOR(S) : Xu et al.

It is certified that error appears in the above-identified patent and that said Letters Patent is hereby corrected as shown below:

In the Claims

Column 31, Line 4 (Claim 3, Line 2): please replace "using the" with --using the following equation:--

Column 31, Line 10 (Claim 3, Line 8): please delete "following equation:"

Column 31, Line 25 (Claim 5, Line 2): please replace "using the" with --using the following equation:--

Column 31, Line 31 (Claim 5, Line 8): please delete "following equation:"

Column 32, Line 42 (Claim 10, Line 10): please replace "where signal," with --where--

Column 33, Line 50 (Claim 15, Line 2): please replace "using" with --using the following equation:--

Column 33, Line 56 (Claim 15, Line 8): please delete "the following equation:"

Signed and Sealed this
Twenty-ninth Day of October, 2024

Katherine Kelly Vidal
*Director of the United States Patent and Trademark Office*